(12) United States Patent
Tsunogae et al.

(10) Patent No.: US 6,346,581 B1
(45) Date of Patent: Feb. 12, 2002

(54) MODIFIED CYCLOOLEFIN ADDITION POLYMER AND CURABLE RESIN COMPOSITION CONTAINING THE SAME

(75) Inventors: Yasuo Tsunogae; Masahiro Ichinose; Yasuhiro Wakizaka, all of Kanagawa (JP)

(73) Assignee: Nippon Zeon Co., Ltd, Tokyo (JP)

( * ) Notice: Subject to any disclaimer, the term of this patent is extended or adjusted under 35 U.S.C. 154(b) by 0 days.

(21) Appl. No.: 09/463,077

(22) PCT Filed: Jul. 21, 1998

(86) PCT No.: PCT/JP98/03254

§ 371 Date: Jan. 18, 2000

§ 102(e) Date: Jan. 18, 2000

(87) PCT Pub. No.: WO99/03903

PCT Pub. Date: Jan. 28, 1999

(30) Foreign Application Priority Data

Jul. 18, 1997 (JP) .............................................. 9/209834
Sep. 30, 1997 (JP) .............................................. 9/282737

(51) Int. Cl.⁷ ......................... C08F 277/00; C08L 45/00
(52) U.S. Cl. ................................ 525/332.1; 525/332.5; 525/210; 525/211; 525/286; 526/281; 526/282
(58) Field of Search ............................. 525/332.1, 152, 525/286, 332.5; 526/210, 211, 281, 282

(56) References Cited

U.S. PATENT DOCUMENTS

| 5,468,819 A | 11/1995 | Goodall et al. |
| 5,585,433 A | * 12/1996 | Yamamoto et al. ........... 525/66 |
| 5,658,998 A | * 8/1997 | Minami et al. ............. 526/281 |

FOREIGN PATENT DOCUMENTS

| EP | 0203799 | 12/1986 |
| JP | 62-27412 | 2/1987 |
| JP | 62-34924 | 2/1987 |
| JP | 64-66216 | 3/1989 |
| JP | 2-133406 | 5/1990 |
| JP | 2-305814 | 12/1990 |
| JP | 3-72512 | 3/1991 |
| JP | 3-74409 | 3/1991 |
| JP | 3-205408 | 9/1991 |
| JP | 4-63807 | 2/1992 |
| JP | 5-214079 | 8/1993 |
| JP | 5-262821 | 10/1993 |
| JP | 5-279412 | 10/1993 |
| JP | 6-172423 | 6/1994 |
| JP | 7-258318 | 10/1995 |
| JP | 8-20692 | 1/1996 |
| JP | 8-198919 | 8/1996 |
| JP | 8-259784 | 10/1996 |
| JP | 8-332701 | 12/1996 |
| JP | 10-182799 | 7/1998 |
| WO | WO9514048 | 5/1995 |
| WO | WO9637529 | 11/1996 |
| WO | WO9818838 | 5/1998 |

OTHER PUBLICATIONS

Mathew et al, *Macromolecules*, 29, 2755–2763 (1996).
Sen et al, J. Organomet. Chem., 358, 579–588 (1988).

* cited by examiner

Primary Examiner—James J. Seidleck
Assistant Examiner—Olga Asinovsky
(74) Attorney, Agent, or Firm—Dinsmore & Shohl LLP

(57) ABSTRACT

A curable resin composition comprising a modified cycloolefin addition polymer (A) obtained by introducing a functional group into a cycloolefin addition polymer containing a repeating unit (a) derived from a cycloolefin monomer having an organic group having at least 4 carbon atoms at its side chain at a rate of introduction of the functional group of 0.1 to 50 mol % based on the whole repeating unit of the cycloolefin addition polymer, and a hardening agent (B), and a modified cycloolefin addition polymer (A) obtained by introducing a functional group into a cycloolefin addition polymer containing a repeating unit (a) derived from a cycloolefin monomer having an organic group having at least 4 carbon atoms at its side chain at a rate of introduction of the functional group of 0.1 to 50 mol % based on the whole repeating unit of the cycloolefin addition polymer, and having a weight average molecular weight (Mw) of 1,000 to 1,000,000.

43 Claims, No Drawings

MODIFIED CYCLOOLEFIN ADDITION POLYMER AND CURABLE RESIN COMPOSITION CONTAINING THE SAME

TECHNICAL FIELD

The present invention relates to modified cycloolefin addition polymers and curable (hardening) resin compositions containing such a polymer, and more particularly to modified cycloolefin addition polymers excellent in heat resistance, mechanical properties, solution viscosity characteristics, adhesion to metals, dielectric properties, low moisture absorption property, chemical resistance, etc., and curable resin compositions excellent in flexibility and thick film-forming property. The modified cycloolefin addition polymers and curable resin compositions containing such a polymer according to the present invention are particularly suitable for use in, for example, a field of electronic parts as interlayer insulating films, protective films, sealing materials, adhesives and the like.

BACKGROUND ART

Cycloolefin polymers such as norbornene polymers have attracted attention as insulating materials in an electrical and electronic field because they are excellent in dielectric properties and low water absorption property. Of the cycloolefin polymers, cycloolefin addition polymers typified by norbornene addition polymers generally have a high glass transition temperature and tend to be provided as polymers having a high degree of saturation and are hence suitable for use in field of which high heat resistance, chemical resistance (solvent resistance) and the like are required. It is also known that when a hardening (curing) agent is blended into a cycloolefin addition polymer to prepare a curable resin composition, the heat resistance and chemical resistance of the polymer are further improved.

For example, Japanese Patent Application Laid-Open No. 259784/1996 discloses a process in which a methyltetracyclododecene (MTD)/ethylene addition copolymer or MTD/ethylene/ethylidenenorbornene terpolymer is epoxy-modified, and a bisazide hardening agent or amine hardening agent is then blended into the resultant modified product to prepare a curable resin composition. This publication also discloses the fact that the use of such a curable resin composition permits the formation of an insulating film excellent in heat resistance and solvent resistance in addition to properties such as low water absorption property and dielectric properties. However, the film formed by using such a curable resin composition is insufficient in flexibility and hence difficult to form a thick film. In fact, these curable resin compositions have involved a problem that when a film having a thickness of at least 10 μm is actually formed to cure it, the resulting film tends to crack, and so its reliability as an insulating film is insufficient.

On the other hand, addition polymer of substituent-containing norbornenes or addition copolymers of such a substituent-containing norbornene with norbornene have been known as norbornene addition polymers containing a substituent group having a relatively great number of carbon atoms [Japanese Patent Application Laid-Open No. 198919/1996, U.S. Pat. No. 5,468,819, International Patent WO 95/14048, International Patent WO 96/37526, and Macromolecules, 29, 2755 (1996)]. Of these papers, Japanese Patent Application Laid-Open No. 198919/1996, U.S. Pat. No. 5,468,819 and International Patent WO 95/14048 disclose addition copolymers of a long chain linear alkyl-substituted norbornene with norbornene and describe the fact that when norbornene is copolymerized with the long chain alkyl-substituted norbornene, the glass transition temperature (Tg) of the resulting norbornene addition polymer is lowered. International Patent WO 96/37526, and Macromolecules, 29, 2755 (1996) describe addition polymers of norbornene having a long chain linear carboxylic ester as a substituent or addition copolymers of the ester group-containing norbornene with norbornene. However, these norbornene addition (co)polymers is insufficient in adhesion to metals and the like, and their use in application fields such as overcoating films, interlayer insulating films, passivation films, buffer coating films and sealing materials is limited to a great extent.

DISCLOSURE OF THE INVENTION

It is an object of the present invention to provide a modified cycloolefin addition polymer excellent in heat resistance, mechanical properties, solution viscosity characteristics, adhesion to metals, dielectric properties, low moisture absorption property, chemical resistance, etc.

Another object of the present invention is to provide a process for preparing a modified cycloolefin addition polymer having such excellent various properties.

A further object of the present invention is to provide a curable resin composition which is excellent in heat resistance, mechanical properties, solution viscosity characteristics, adhesion to metals, dielectric properties, low moisture absorption property, chemical resistance, etc., and also in flexibility and thick film-forming property and has a low coefficient of linear expansion.

The present inventors have carried out an extensive investigation with a view toward overcoming the above-described problems involved in the prior art. As a result, it has been found that a modified cycloolefin addition polymer obtained by introducing a functional group into a cycloolefin addition polymer containing a repeating unit (a) derived from a cycloolefin monomer having an organic group having at least 4 carbon atoms at its side chain is excellent in adhesion to metals and the like and also flexibility, so that no cracking occurs in a thick film even when the film is formed from the addition polymer to cure it. The modified cycloolefin addition polymer according to the present invention, and a curable resin composition comprising the polymer and a hardening agent are excellent in heat resistance, mechanical properties, solution viscosity characteristics, adhesion to metals, dielectric properties, low moisture absorption property, chemical resistance, etc. The present invention has been led to completion on the basis of these findings.

According to the present invention, there is thus provided a curable resin composition comprising a modified cycloolefin addition polymer (A) obtained by introducing a functional group into a cycloolefin addition polymer containing a repeating unit (a) derived from a cycloolefin monomer having an organic group having at least 4 carbon atoms at its side chain at a rate of introduction of the functional group of 0.1 to 50 mol % based on the whole repeating unit of the cycloolefin addition polymer, and a hardening agent (B).

According to the present invention, there is also provided a cured product obtained by curing the curable resin composition, particularly, a film.

According to the present invention, there is further provided a modified cycloolefin addition polymer (A) obtained by introducing a functional group into a cycloolefin addition polymer containing a repeating unit (a) derived from a cycloolefin monomer having an organic group having at least 4 carbon atoms at its side chain at a rate of introduction of the functional group of 0.1 to 50 mol % based on the whole repeating unit of the cycloolefin addition polymer, and having a weight average molecular weight (Mw) of 1,000 to 1,000,000.

According to the present invention, there is still further provided a process for preparing a modified cycloolefin addition polymer (A) having a weight average molecular weight (Mw) of 1,000 to 1,000,000, the process comprising graft-reacting an unsaturated compound having a functional group with a cycloolefin addition polymer containing a repeating unit (a) derived from a cycloolefin monomer having an organic group having at least 4 carbon atoms at its side chain, thereby introducing the functional group at a rate of introduction of the functional group of 0.1 to 50 mol % based on the whole repeating unit of the cycloolefin addition polymer.

According to the present invention, there is yet still further provided a process for preparing a modified cycloolefin addition polymer (A) having a weight average molecular weight (Mw) of 1,000 to 1,000,000, the process comprising modifying carbon-carbon unsaturated bonds in a cycloolefin addition polymer containing a repeating unit (a) derived from a cycloolefin monomer having an organic group having at least 4 carbon atoms at its side chain to add a functional group to the cycloolefin addition polymer, or bonding a compound having a functional group to the unsaturated bonds, thereby introducing the functional group at a rate of introduction of the functional group of 0.1 to 50 mol % based on the whole repeating unit of the cycloolefin addition polymer.

BEST MODE FOR CARRYING OUT THE INVENTION (Curable Resin Composition)

The curable resin composition according to the present invention is a curable resin composition comprising a modified cycloolefin addition polymer (A) obtained by introducing a functional group into a cycloolefin addition polymer containing a repeating unit (a) derived from a cycloolefin monomer having an organic group having at least 4 carbon atoms at its side chain at a rate of introduction of the functional group of 0.1 to 50 mol % based on the whole repeating unit of the cycloolefin addition polymer, and a hardening agent (B). The cycloolefin addition polymer useful in the practice of the present invention preferably contains at least another repeating unit selected from the group consisting of a repeating unit (b) derived from a cycloolefin monomer having no organic group having at least 4 carbon atoms at its side chain and (c) a repeating unit derived from a vinyl compound in addition to the repeating unit (a) derived from the cycloolefin monomer having an organic group having at least 4 carbon atoms at its side chain. The cycloolefin addition polymer preferably contains the repeating unit (a) derived from the cycloolefin monomer having an organic group having at least 4 carbon atoms at its side chain in a proportion of 5 to 100 mol %, preferably 10 to 70 mol % based on the whole repeating unit of the cycloolefin addition polymer.

(Cycloolefin Polymer)

The cycloolefin addition polymer used for providing the modified cycloolefin addition polymer in the present invention is an addition polymer containing a repeating unit of a norbornene monomer such as norbornene (i.e., bicyclo[2.2.1]hept-2-ene), tetracyclododecene (i.e., tetracyclo[4.4.1$^{2,5}$.1$^{7,10}$.0]dodec-3-ene or dicyclopentadiene (i.e., tricyclo[4.3.1$^{2,5}$.0]deca-3,7-diene; a repeating unit of a monocycloolefin monomer such as cyclopentene or cyclohexene; or a repeating unit of a cyclic conjugated diene monomer such as cyclopentadiene or cyclohexadiene. The cycloolefin polymer is a polymer obtained by addition-polymerizing a norbornene monomer, monocycloolefin monomer or cyclic conjugated diene monomer and another monomer copolymerizable therewith using a conventionally known addition polymerization catalyst and optionally hydrogenating remaining carbon-carbon unsaturated bonds after the polymerization.

The cycloolefin addition polymer used in the present invention contains a repeating unit (a) derived from a cycloolefin monomer having an organic group having at least 4 carbon atoms at its side chain. Examples of such an organic group include hydrocarbon groups, oxygen-containing organic groups and nitrogen-containing organic groups. As the organic group having at least 4 carbon atoms, is preferred a hydrocarbon group having 4 to 20 carbon atoms, and examples thereof include butyl, pentyl, hexyl, octyl, decyl, butylidene, pentylidene, hexylidene and decylidene groups. Of these, linear alkyl groups are more preferred. The number of carbon atoms in the organic group is preferably 6 to 12.

(1) Norbornene Addition Polymer

In the present invention, a norbornene addition polymer may be preferably used as the cycloolefin addition polymer. Such a norbornene addition polymer can be obtained by addition homopolymerizing a norbornene monomer having an organic group having at least 4 carbon atoms at its side chain or addition copolymerizing a norbornene monomer having an organic group having at least 4 carbon atoms at its side chain and a norbornene monomer having no organic group having at least 4 carbon atoms at its side chain and/or a vinyl compound. When carbon-carbon unsaturated bonds are present in the addition (co)polymer, the unsaturated bond can be saturated by hydrogenation.

(a) Norbornene monomer having an organic group having at least 4 carbon atoms at its side chain:

Of norbornene monomers having an organic group having at least 4 carbon atoms at their side chains, norbornene monomers, the organic group having at least 4 carbon atoms of which is a hydrocarbon group, include, for example, 5-butylbicyclo[2.2.1]hept-2-ene, 5-hexylbicyclo-[2.2.1]hept-2-ene, 5-decylbicyclo[2.2.1]hept-2-ene, 5-hexadecylbicyclo[2.2.1]hept-2-ene, 5-cyclohexylbicyclo-[2.2.1]hept-2-ene, 5-cyclohexenylbicyclo[2.2.1]hept-2-ene, 5-phenylbicyclo[2.2.1]hept-2-ene, 8-butyltetracyclo-[4.4.1$^{2,5}$.1$^{7,10}$.0]-3-dodecene and 8-hexyltetracyclo-[4.4.1$^{2,5}$.1$^{7,10}$.0]-3-dodecene.

Norbornene monomers, the organic group having at least 4 carbon atoms of which is an oxygen-containing organic group, include, for example, 5-hydroxybutylbicyclo[2.2.1]hept-2-ene, 5-hydroxyhexylbicyclo-[2.2.1]hept-2-ene, 8-hydroxybutyltetracyclo-[4.4.1$^{2,5}$.1$^{7,10}$.0]-3-dodecene, 5-carboxybutylbicyclo-[2.2.1]hept-2-ene, 5,6-dicarboxybutylbicyclo[2.2.1]hept-2-ene, 8-carboxybutyltetracyclo[4.4.1$^{2,5}$.1$^{7,10}$.0]-3-dodecene, 5-butoxycarbonylbicyclo[2.2.1]hept-2-ene, 5-propoxycarbonylbicyclo[2.2.1]hept-2-ene, bicyclo[2.2.1]hept-5-enyl-2-methylpentanoate and bicyclo[2.2.1]hept-5-enyl-2-methylhexanoate.

Norbornene monomers, the organic group having at least 4 carbon atoms of which is a nitrogen-containing organic group, include, for example, 5-aminobutylbicyclo[2.2.1]hept-2-ene, 5-cyanohexylbicyclo-[2.2.1]hept-2-ene, 8-cyanobutyltetracyclo-[4.4.1$^{2,5}$.1$^{7,10}$.0]-3-dodecene, 5-nitro-6-phenylbicyclo-[2.2.1]hept-2-ene, N-phenyl-5-aminobicyclo[2.2.1]hept-2-ene, bicyclo[2.2.1]hept-5-enyl-2-butylamide and bicyclo[2.2.1]hept-5-enyl-2-butylimide.

(b) Another norbornene monomer having no organic group having at least 4 carbon atoms at its side chain:

Examples other norbornene monomers having no organic group having at least 4 carbon atoms at their side chains include bicyclo[2.2.1]hept-2-ene, 5-methylbicyclo-[2.2.1]hept-2-ene, 5-ethylbicyclo[2.2.1]hept-2-ene, 5-ethylidenebicyclo[2.2.1]hept-2-ene, 5-vinylbicyclo[2.2.1]-hept-2-ene, tetracyclo[$4.4.1^{2,5}.1^{7,10}.0$]-3-dodecene, 8-methyltetracyclo[$4.4.1^{2,5}.1^{7,10}.0$]-3-dodecene, 8-ethyltetracyclo[$4.4.1^{2,5}.1^{7,10}.0$]-3-dodecene, tricyclo-[$4.3.0.1^{2,5}$]-3-decene, tricyclo[$4.3.0.1^{2,5}$]-3,7-decadiene, 1,4-methano-1,4,4a,9a-tetrahydrofluorene, 5-carboxymethylbicyclo[2.2.1]hept-2-ene, 5-carboxyethylbicyclo-[2.2.1]hept-2-ene, 5-methyl-5-carboxymethyl-bicyclo[2.2.1]hept-2-ene, 5-methyl-5-carboxyethylbicyclo-[2.2.1]hept-2-ene, 5-acetoxybicyclo[2.2.1]hept-2-ene, bicyclo[2.2.1]hept-2-ene-5,6-dicarboxylic acid imide, bicyclo[2.2.1]hept-2-ene-5,6-dicarboxylic anhydride, 8-carboxymethyltetracyclo-[$4.4.1^{2,5}.1^{7,10}.0$]-3-dodecene and 8-methyl-8-carboxymethyltetracyclo[$4.4.1^{2,5}.1^{7,10}.0$]-3-dodecene.

(c) Vinyl compound:

In the present invention, any monomers may be used without particular limitation so far as it is a monomer copolymerizable with such norbornene monomers as mentioned above. Of these, vinyl compounds are preferred.

Examples of the vinyl compounds include α-olefins having 2 to 12 carbon atoms, such as ethylene, propylene, 1-butene and 4-methyl-1-pentene; styrene and derivatives thereof such as styrene, α-methylstyrene, p-methylstyrene, p-chlorostyrene and divinylbenzene; linear conjugated dienes such as 1,3-butadiene and isoprene; and vinyl ethers such as ethyl vinyl ether and isobutyl vinyl ether. Of these, α-olefins such as ethylene and styrene and derivatives thereof such as styrene are preferred, with ethylene being particularly preferred.

As the norbornene addition polymers, are particularly preferred ① an addition copolymer of 2-norbornene and 5-substituted-2-norbornene having a hydrocarbon group having 4 to 20 carbon atoms as a substituent, ② an addition copolymer of 2-norbornene, 5-substituted-2-norbornene having a hydrocarbon group having 4 to 20 carbon atoms as a substituent and a further norbornene monomer, and ③ an addition copolymer of 2-norbornene, 5-substituted-2-norbornene having a hydrocarbon group having 4 to 20 carbon atoms as a substituent and ethylene from the viewpoint of various properties such as heat resistance. More specific examples of the preferred norbornene addition polymers include 2-norbornene/5-decyl-2-norbornene addition copolymers, 2-norbornene/5-hexyl-2-norbornene addition copolymers, 2-norbornene/5-hexyl-2-norbornene/ethylene addition terpolymers and 2-norbornene/5-hexyl-2-norbornene/5-ethylidene-2-norbornene addition terpolymers.

(Polymerization Catalyst and Polymerization Process)

With respect to the polymerization catalyst and polymerization process of the norbornene monomer(s), polymerization may be conducted in accordance with a process known per se in the art. For example, the polymerization catalysts and polymerization processes disclosed in, J. Organomet. Chem., 358, 576–588 (1988), Japanese Patent Application Laid-Open Nos. 205408/1991, 63807/1992 and 262821/1993, and WO 95/14048 may be used.

As the polymerization catalyst, is used a catalyst comprising a transition metal belonging to Group VIII of the periodic table as a main component. Examples of the transition metal belonging to Group VIII of the periodic table include iron, cobalt, nickel, ruthenium, rhodium, palladium and platinum. Of these, cobalt, nickel and palladium are preferred. Specific examples of the catalyst comprising such a transition metal as a main component will hereinafter be described.

Examples of iron compounds include iron (II) chloride, iron (III) chloride, iron (II) acetate, iron (II) acetylacetonate and ferrocene. Examples of cobalt compounds include cobalt (II) acetate, cobalt (II) acetylacetonate, cobalt (II) tetrafluoroborate, cobalt chloride and cobalt (II) benzoate. Examples of nickel compounds include nickel acetate, nickel acetylacetonate, nickel carbonate, nickel chloride, nickel ethylhexanoate, nickelocene, $NiCl_2(PPh_3)_2$ (wherein Ph is a phenyl group), bisallylnickel and nickel oxide. Examples of palladium compounds include palladium chloride, palladium bromide, palladium oxide, $PdCl_2(PPh_3)_2$, $PdCl_2(PhCN)_2$, $PdCl_2(CH_3CN)_2$, [Pd$(CH_3CN)_4$][$BF_4$]$_2$, [Pd$(C_2H_5CN)_4$][$BF_4$]$_2$, palladium acetylacetonate and palladium acetate. Of these, palladium chloride, nickel acetylacetonate, $PdCl_2(PhCN)_2$ and [Pd$(CH_3CN)_4$][$BF_4$]$_2$ are particularly preferred.

These catalysts may be used either singly or in any combination thereof. The amount of the catalyst used may be suitably selected according to polymerization conditions and the like. However, it is generally 1/1,000,000 to 1/10, preferably 1/100,000 to 1/100 in terms of its molar ratio to the total amount of the norbornene monomer(s).

In the present invention, a promoter may be used as needed. For example, alkylaluminum halides and aluminoxane are preferably used. The promotors may be used either singly or in any combination thereof. The amount of the promoter used is suitably selected according to the kind of the promoter used, and the like. When the promotor is used, the amount used is generally within a range of 1 to 100,000, preferably 2 to 10,000 in terms of a ratio (molar ratio) of aluminum atom to the transition metal in the catalyst.

The polymerization reaction may be conducted either by bulk polymerization without using any solvent or in a solvent such as an organic solvent. No particular limitation is imposed on the solvent so far as it is inert to the polymerization reaction. However, examples thereof include aromatic hydrocarbons such as benzene, toluene and xylene; aliphatic hydrocarbons such as n-pentane, hexane and heptane; alicyclic hydrocarbons such as cyclohexane; halogenated hydrocarbons such as dichloroethane, dichloroethylene, tetrachloroethane, chlorobenzene, dichlorobenzene and trichlorobenzene; and nitrogen-containing hydrocarbons such as nitromethane, nitrobenzene, acetonitrile and benzonitrile.

The polymerization temperature is generally within a range of −50° C. to 250° C., preferably −30° C. to 200° C., more preferably −20° C. to 150° C., and the polymerization pressure is generally within a range of 0 to 50 kg/cm$^2$, preferably 0 to 20 kg/cm$^2$. The polymerization time is suitably selected according to polymerization conditions, but is generally within a range of 30 minutes to 20 hours, preferably 1 to 10 hours.

(2) Monocycloolefin Addition Polymer

In the present invention, an addition polymer having a repeating unit of a monocycloolefin monomer may be used as the cycloolefin addition polymer. The monocycloolefin monomer is a monomer having a carbon-carbon double bond in its ring, and examples thereof include monocyclic cycloolefin monomers such as cyclobutene, cyclopentene, cyclohexene, cycloheptene and cyclooctene (for example, Japanese Patent Application Laid-Open No. 66216/1989). These monocycloolefin monomers may be used either singly or in any combination thereof.

(3) Cyclic Conjugated Diene Addition Polymer

In the present invention, an addition polymer having a repeating unit of a monocyclic conjugated diene monomer may be used as the cycloolefin addition polymer. The monocyclic conjugated diene monomer is a monomer having conjugated carbon-carbon double bonds in its ring, and examples thereof include 1,3-cyclopentadiene, 1,3-cyclohexadiene, 1,3-cycloheptadiene and 1,3-cyclooctadiene (for example, Japanese Patent Application Laid-Open No. 258318/1995). These cyclic conjugated diene monomers may be used either singly or in any combination thereof.

Of these cycloolefin addition polymers, the norbornene addition polymers are preferred from the viewpoints of strength properties, molding and processing ability, solution viscosity characteristics and the like.

As other monomers copolymerizable with these cycloolefin monomers, may be mentioned α-olefins having 2 to 12 carbon atoms, such as ethylene, propylene, 1-butene and 4-methyl-1-pentene; styrene and derivatives thereof such as styrene, α-methylstyrene, p-methylstyrene, p-chlorostyrene and divinylbenzene; linear conjugated dienes such as 1,3-butadiene and isoprene; vinyl ethers such as ethyl vinyl ether and isobutyl vinyl ether; and carbon monoxide. Such other monomers are not particularly limited to the above monomers so far as they are copolymerizable with the cycloolefin monomers.

The molecular weight of the cycloolefin addition polymer used in the present invention is generally 1,000 to 1,000,000, preferably 5,000 to 500,000, more preferably 10,000 to 300,000 when expressed by a weight average molecular weight (Mw) in terms of polystyrene as measured by gel permeation chromatography (GPC). The molecular weight is generally 1,000 to 500,000, preferably 3,000 to 300,000, more preferably 5,000 to 2500,000, most preferably 10,000 to 200,000 when expressed by a number average molecular weight (Mn).

If the number average molecular weight is extremely low, the mechanical strength of the polymer becomes poor. If the molecular weight is too high on the other hand, the viscosity of the polymer becomes too high, and so mixing of the resulting modified polymer with a hardening agent becomes difficult.

The glass transition temperature (Tg) or melting point (Tm) of the cycloolefin addition polymer according to the present invention is generally about 180 to 400° C., preferably 200 to 350° C., more preferably 220 to 280° C. as measured by a differential scanning calorimeter (DSC). It is preferred that the glass transition temperature should fall within the above range, since deterioration of mechanical strength of the resulting modified polymer particularly in a region of high temperatures such as a temperature upon mounting of electronic parts and the like, and a reliability testing temperature, and its viscosity characteristics also becomes excellent.

(Modified Cycloolefin Addition Polymer)

The modified cycloolefin addition polymer according to the present invention is a modified polymer obtained by introducing a functional group into the above-described cycloolefin addition polymer at a rate of introduction of the functional group of 0.1 to 50 mol % based on the whole repeating unit of the cycloolefin addition polymer.

As the functional group, is used a group capable of reacting with a hardening agent. No particular limitation is imposed on the kind of the functional group so far as it is capable of reacting with a hardening agent such as a radical crosslinking agent or ionic crosslinking agent to cure the cycloolefin polymer, thereby enhancing the heat resistance, solvent resistance and the like of the polymer and moreover adhesion and the like. Specific examples of the functional group include epoxy, carboxyl, hydroxyl, ester, silanol, silyl, amino, nitrile, halogeno, acyl, sulfone and vinyl groups. Of these, oxygen-containing functional groups capable of reacting with an acid or basic hardening agent such as a polyhydric phenol or amine, for example, polar groups such as epoxy group, acid anhydride, carboxyl group and hydroxyl groups are preferred for reasons of, for example, making it possible to enhance crosslinking density and adhesion at a low modification rate, permitting the selection of a hardening agent from a wide range, and easily controlling the curing rate with the hardening agent, with functional groups which generate a terminal —OH group such as a hydroxyl or carboxyl group after curing, for example, epoxy and acid anhydride groups being particularly preferred.

[Method for Introducing a Functional Group]

Methods for introducing a functional group include a method in which a cycloolefin addition polymer is modified, and a method in which a monomer having a functional group is copolymerized upon addition polymerization. Specific examples thereof include (1) a method in which an unsaturated compound having a functional group is introduced into a cycloolefin addition polymer by a graft reaction (graft-modifying method), (2) a method in which in which when carbon-carbon unsaturated bonds are present in a cycloolefin addition polymer, a functional group is directly added to the carbon-carbon unsaturated bonds, and (3) a method in which a monomer having a functional group is copolymerized in advance upon the formation of a cycloolefin addition polymer.

Of these methods, the method (3) involves problems that the kinds of monomers having a functional group are limited, and the synthesis of such a monomer is often difficult. According to the method (2), the heat resistance of the resulting polymer may be deteriorated in some cases when unreacted unsaturated bonds remain. Accordingly, the graft-modifying method of the method (1) is particularly preferred among these methods.

(1) Graft Reaction of a Functional Group-containing Unsaturated Compound

As examples of the unsaturated compound having a functional group, may be mentioned vinyl compounds having a functional group, and cycloolefins having a functional group. The introduction of the functional group by the graft-modifying method can be carried out by reacting the cycloolefin addition polymer with a functional group-containing unsaturated compound in the presence of an organic peroxide. No particular limitation is imposed on the functional group-containing unsaturated compound. However, epoxy group-containing unsaturated compounds, carboxyl group-containing unsaturated compounds, hydroxyl group-containing unsaturated compounds, silyl group-containing unsaturated compounds, unsaturated organosilicon compounds, etc. are mentioned for reasons of improvements of crosslinking density and adhesion to substrates (boards) at a low modification rate.

Examples of the epoxy group-containing unsaturated compounds or epoxy group-containing cycloolefins include glycidyl esters of unsaturated carboxylic acids such as glycidyl acrylate, glycidyl methacrylate and glycidyl p-styryl-carboxylate; mono- or polyglycidyl esters of unsaturated polycarboxylic acids such as endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methyl-allyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)-ethylene oxide, 2-(p-allylphenyl) ethylene oxide, 2-(o-vinylphenyl)propylene oxide, 2-(p-vinylphenyl)propylene oxide, 2-(o-allylphenyl)propylene oxide, 2-(p-allylphenyl) propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide and allyl-2,3-epoxycyclopentyl ether. These epoxy group-containing unsaturated compounds may be used either singly or in any combination thereof.

As examples of the carboxyl group-containing unsaturated compounds, may be mentioned compounds described in Japanese Patent Application Laid-Open No. 271356/1993, for example, unsaturated carboxylic acids such as acrylic acid, methacrylic acid and α-ethylacrylic acid; and unsaturated dicarboxylic acid such as maleic acid, fumaric acid, itaconic acid, endo-cis-bicyclo-[2.2.1]hept-5-ene-2,3-dicarboxylic acid and methyl-endo-cis-bicyclo[2.2.1]hept-5-ene-2,3-dicarboxylic acid. Further, as examples of the unsaturated carboxylic acid derivatives, may be mentioned anhydrides, esters, halides, amides and imides of unsaturated carboxylic acids, and specific examples thereof include acid anhydrides such as maleic anhydride, chloromaleic anhydride, butenylsuccinic anhydride, tetrahydrophthalic anhydride and citraconic anhydride; esters such as monomethyl maleate, dimethyl maleate and glycidyl maleate; and malenyl chloride and maleimide. Of these, unsaturated dicarboxylic acids and anhydrides thereof are preferred for reasons of easy introduction of the functional group by a graft reaction, and the like, with acid anhydrides such as maleic anhydride and itaconic anhydride being particularly preferred.

Examples of the hydroxyl group-containing unsaturated compounds include allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol.

Examples of the silyl group-containing unsaturated compounds include chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1,3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyldimethylsilane and allyloxytrimethylsilane.

Examples of the unsaturated organosilicon compounds include trisalkoxyvinylsilanes such as trimethoxyvinylsilane, triethoxyvinylsilane, tris(methoxyethoxy)vinylsilane. The alkoxy groups in such an unsaturated organosilicon compounds can be hydrolyzed into silanol groups.

The graft-modified cycloolefin addition polymer according to the present invention can be obtained by graft-reacting the unsaturated compound having a functional group with the cycloolefin addition polymer under generation of a radical. As methods for generating the radical, may be mentioned (i) a method making use of an organic peroxide, (ii) a method making use of a photo-induced radical generator, (iii) a method by irradiation of energy rays, and (iv) a method by heating.

(i) Method making use of an organic peroxide:

As the organic peroxide, for example, organic peroxides, organic peresters, etc. may be preferably used. As specific examples of such an organic peroxide, may be mentioned benzoyl peroxide, dichlorobenzoyl peroxide, dicumyl peroxide, di-tert-butyl peroxide, 2,5-dimethyl-2,5-di(peroxide benzoate)hexyne-3, 1,4-bis(tert-butyl peroxyisopropyl)benzene, lauroyl peroxide, tert-butyl peracetate, 2,5-dimethyl-2,5-di(tert-butyl peroxy)hexyne-3, 2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. In the present invention, azo compounds may also be used as the organic peroxides. As specific examples of the azo compounds, may be mentioned azobisisobutyronitrile and dimethyl azoisobutyrate.

Of these, benzoyl peroxide, and dialkyl peroxides such as dicumyl peroxide, di-tert-butyl peroxide, 2,5-dimethyl-2,5-di(tert-butyl peroxide)hexyne-3, 2,5-dimethyl-2,5-di(tert-butyl peroxy)hexane and 1,4-bis(tert-butyl peroxyisopropyl)benzene are preferably used.

These organic peroxides may be used either singly or in any combination thereof. A proportion of the organic peroxide used is generally within a range of 0.001 to 10 parts by weight, preferably 0.01 to 5 parts by weight, more preferably 0.1 to 2.5 parts by weight per 100 parts by weight of the unmodified cycloolefin addition polymer. When the proportion of the organic peroxide used falls within this range, the rate of reaction of the functional group-containing unsaturated compound, and various properties of the resulting functional group-containing polymer, such as water absorptivity and dielectric properties, are balanced with one another at a high level. It is hence preferable to use the organic peroxide within such a range.

No particular limitation is imposed on the graft-modifying reaction, and the reaction may be carried out in accordance with a method known per se in the art. The reaction is conducted at a temperature of generally 0 to 400° C., preferably 60 to 350° C. The reaction time is generally within a range of 1 minute to 24 hours, preferably 30 minutes to 10 hours. After completion of the reaction, a poor solvent such as methanol is added in a great amount to the reaction system to deposit a polymer formed, and the polymer can be collected by filtration, washed and then dried under reduced pressure.

(ii) Method making use of a photo-induced radical generator:

The method making use of the photo-induced radical generator is a method in which after the photo-induced radical generator is added, the resultant mixture is exposed to ultraviolet light to generate a radical, and any conventionally known method may be used. The photo-induced radical generator may be any substance so far as it is activated by irradiation of ultraviolet light. Specific examples thereof include carbonyl compounds such as benzoin, benzoin methyl ether, benzoin isopropyl ether, benzoin isobutyl ether, acetoin, butyroin, toluoin, benzyl, benzophenone, 2,2-dimethoxy-2-phenylacetophenone, α-hydroxycyclohexyl phenyl ketone, p-isopropyl-α-hydroxyisibutylphenone, α,α-dichloro-4-phenoxyacetophenone, methylphenyl glyoxylate, ethylphenyl glyoxylate, 4,4-bis(dimethylaminophenone) and 1-phenyl-1,2-propandione-2-(o-ethoxycarbonyl).oxime; sulfur compounds such as tetramethylthiuram monosulfide and tetramethylthiuram disulfide; azo compounds such as azobisisobutyronitrile and azobis-2,4-dimethylvaleronitrile; peroxide compounds such as benzoyl peroxide and di(t-butyl) peroxide; acylphosphine oxides such as 2,4,6-trimethylbenzoyldiphenylphosphine oxide.

A proportion of the photo-induced radical generator used is generally within a range of 0.001 to 10 parts by weight, preferably 0.01 to 5 parts by weight, more preferably 0.1 to 2.5 parts by weight, in terms of a charged proportion upon the reaction, per 100 parts by weight of the unmodified cycloolefin addition polymer. When the proportion of the photo-induced radical generator used falls within this range, the rate of reaction of the functional group-containing unsaturated compound, and various properties of the resulting functional group-containing polymer, such as water absorptivity and dielectric properties, are balanced with one another at a high level. It is hence preferable to use the photo-induced radical generator within such a range.

(iii) Method by irradiation of energy rays:

The method by irradiation of energy rays is a publicly known method in which active energy rays such as α-rays, β-rays and γ-rays are irradiated to generate a radical. In particular, it is desired that ultraviolet light be used from the viewpoints of efficiency, practicability and profitability.

(iv) Method by heating:

The radical generating method by heating is carried out by heating in a temperature range of 100 to 390° C. Both publicly known solution method, and melting and kneading method may be used. Of these, the melting and kneading method using an extruder or the like by which shear stress is applied upon heating is preferred from the viewpoint of reaction efficiency.

(2) Direct Modification of Carbon-Carbon Unsaturated Bonds

When carbon-carbon unsaturated bonds are present in the cycloolefin addition polymer used, the modified cycloolefin addition polymer according to the present invention can be obtained by modifying the carbon-carbon unsaturated bonds to add a functional group to the addition polymer or bonding a compound having a functional group to the carbon-carbon unsaturated bonds, thereby introducing the functional group into the addition polymer.

No particular limitation is imposed on the method for introducing the functional group, and examples thereof include (a) a method by oxidation of unsaturated bonds, (b) a method by an addition reaction of a compound containing at least one functional group in its molecule to unsaturated bonds, and (c) a method of introducing an epoxy group, carboxyl group, hydroxyl group or the like by any other method (for example, Japanese Patent Application Laid-Open No. 172423/1994).

(3) Copolymerization of Functional Group-containing Monomer

No particular limitation is imposed on the functional group-containing monomer. However, it is preferable to copolymerize such a hydroxyl, carboxyl or ester group-containing monomer as exemplified in the item of the cycloolefin monomer, for example, 5-hydroxymethylnorbornene, 5-hydroxyisopropylnorbornene, 5-methoxycarbonylnorbornene, 8-methoxycarbonyltetracyclododecene, 5,6-dicarboxynorbornene or the like. As the polymerization catalyst and polymerization process, may be used the publicly known polymerization catalysts and polymerization processes for an alicyclic monomer having a norbornene ring.

Of the above-described methods, the graft-modifying method (1) is preferred for reasons of, for example, the fact that the modification can be carried out under easy reaction conditions and that the functional group can be easily introduced at a high modification rate. As the kind of the functional group-containing unsaturated compound subjected to the graft reaction, is particularly preferred an unsaturated compound having an epoxy group or an unsaturated compound having a dicarboxylic acid anhydride group in its molecule, such as maleic anhydride or itaconic anhydride for the above-described reasons.

The rate of introduction of the functional group in the cycloolefin addition polymer according to the present invention is suitably selected as necessary for the end application intended. However, it is generally within a range of 0.1 to 50 mol %, preferably 0.5 to 40 mol %, more preferably 1 to 30 mol % based on the whole repeating unit (the total number of monomer units) in the polymer. When the rate of introduction of the functional group in the modified cycloolefin addition polymer falls within this range, the film-forming property, strength properties, heat resistance, solvent resistance and dielectric properties of the polymer are balanced with one another at a high level. It is hence preferable to introduce the functional group at a rate of introduction within the above range.

The rate of introduction of the functional group (modification rate: mol %) is represented by the following equation (1):

$$\text{Rate of introduction of the polar group} = (X/Y) \times 100 \tag{1}$$

wherein

X:
(a) the total number of moles of modifying residue introduced by a graft monomer,
(b) (the total number of moles of unsaturated bond-containing monomer)×(rate of addition of functional group to unsaturated bonds), or
(c) the total number of moles of the functional group-containing monomer (all, determined by $^1$H-NMR); and Y: the total number of monomer units in the polymer (weight average molecular weight of the polymer/average molecular weight of the monomer).

The molecular weight of the modified cycloolefin addition polymer is generally 1,000 to 1,000,000, preferably 5,000 to 500,000, more preferably 10,000 to 300,000 when expressed by a weight average molecular weight (Mw) in terms of polystyrene as measured by GPC. The number average molecular weight (Mn) thereof is generally 1,000 to 500,000, preferably 3,000 to 300,000, more preferably 5,000 to 2500,000, most preferably 10,000 to 200,000.

The repeating unit (a) derived from the cycloolefin monomer (a) having an organic group having at least 4 carbon atoms at its side chain is contained in a proportion of preferably 5 to 100 mol %, more preferably 10 to 70 mol %, most preferably 15 to 50 mol % in the whole repeating unit of the cycloolefin addition polymer. If this proportion is too low, the flexibility and film-forming property of such a polymer are deteriorated.

Incidentally, an unmodified cycloolefin addition polymer having no functional group may be used in fields of which flexibility and the like are particularly required.

(Modified Norbornene Addition Polymer)

The modified cycloolefin addition polymer according o the present invention is preferably a modified norbornene addition polymer. Such a modified norbornene addition polymer is a novel polymer.

The modified cycloolefin addition polymer according to the present invention is obtained by modifying a cycloolefin addition polymer composed of only a repeating unit (a) derived from a cycloolefin monomer having an organic group having at least 4 carbon atoms at its side chain, or a cycloolefin addition polymer containing the repeating unit (a) and at least one of other repeating units selected from the group consisting of a repeating unit (b) derived from a cycloolefin monomer having no organic group having at least 4 carbon atoms at its side chain and (c) a repeating unit derived from a vinyl compound. Both repeating units (a) and (b) are preferably derived from norbornene monomers.

The repeating unit (a) derived from the cycloolefin monomer having an organic group having at least 4 carbon atoms at its side chain is preferably that represented by the formula [I]:

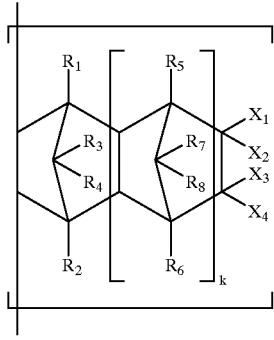

[I]

wherein
k=0, 1 or 2,
R$_1$ to R$_8$=independently a hydrogen atom, halogen atom or methyl group,
X$_1$ to X$_4$=independently an organic group having at least 4 carbon atoms, a hydrogen atom, a halogen atom, or a substituent having at most 3 carbon atoms, with the proviso that at least one of them is the organic group having at least 4 carbon atoms.

At least one of X$_1$ to X$_4$ is an organic group having at least 4 carbon atoms and is not bonded to any other group to form a ring. The remaining substituents are independently a hydrogen atom, halogen atom, or organic group having at most 3 carbon atoms. Specific examples of X$_1$ to X$_4$ include hydrocarbon groups such as alkyl, alkenyl, cycloalkyl, cycloalkenyl and phenyl groups; oxygen-containing substituents such as hydroxyl, ether, carboxyl, carbonyl and ester groups; nitrogen-containing substituents such as amino, imino, amide and nitrile groups; and organic groups containing some of these substituents and having at least 4 carbon atoms. In particular, it is preferred that a linear hydrocarbon having at least 4 carbon atoms be contained in at least part of the substituents of X$_1$ to X$_4$ from the viewpoint of physical properties such as mechanical properties. As the organic group having at least 4 carbon atoms, is most preferred a linear alkyl group having 6 to 12 carbon atoms.

The repeating unit represented by the formula [I] an be obtained by addition-polymerizing a norbornene monomer represented by the formula [I-1]:

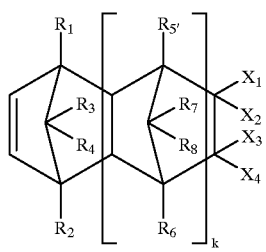

[I-1]

wherein the respective meanings of the reference characters are the same as defined in the formula [I].

From the viewpoints of solubility in solvents and solution viscosity characteristics, the repeating unit (a) derived from the cycloolefin monomer having an organic group having at least 4 carbon atoms at its side chain is more preferably that represented by the formula [VI]:

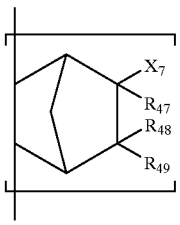

[VI]

wherein
X$_7$=a substituent having 4 to 20 carbon atoms, and
R$_{47}$ to R$_{49}$=independently a hydrogen atom, halogen atom, methyl group or ethyl group. X$_7$ is preferably a linear hydrocarbon group, more preferably a linear alkyl group, most preferably a linear alkyl group having 6 to 12 carbon atoms.

The repeating unit represented by the formula [VI] can be obtained by addition-polymerizing a norbornene monomer represented by the formula [VI-1]:

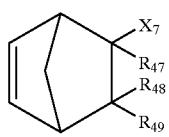

[VI-1]

wherein the respective meanings of the reference characters are the same as defined in the formula [VI].

From the viewpoint of heat resistance, the repeating unit (b) derived from the cycloolefin monomer (norbornene monomer) having no organic group having at least 4 carbon atoms at its side chain is preferably a repeating unit represented by the formula [II]:

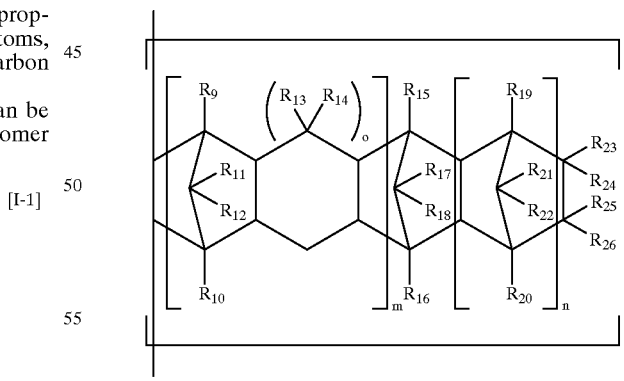

[II]

wherein
m=0 or 1,
n=0 or a positive integer, preferably 0, 1 or 3,
o=0 or 1,
R$_{29}$ to R$_{22}$=independently a hydrogen atom, halogen atom or methyl group, and
R$_{23}$ to R$_{26}$=independently a substituent having at most 3 carbon atoms, or a substituent bonded to each other to form a monocycle or polycycle, said substituent may having carbon-carbon double bond(s); or
a repeating unit represented by the formula [III]:

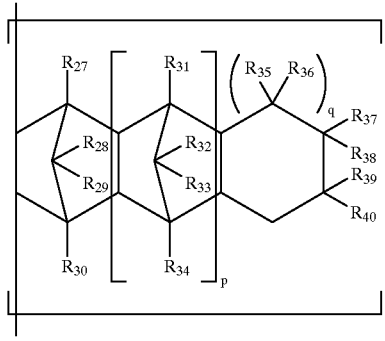

[III]

wherein
p=0, 1 or 2,
q=0, 1 or 2,
$R_{27}$ to $R_{36}$=independently a hydrogen atom, halogen atom or methyl group, and
$R_{37}$ to $R_{40}$=independently a substituent having at most 3 carbon atoms, or a substituent bonded to each other to form a monocycle or polycycle, said substituent may having carbon-carbon double bond(s).

These repeating units can be obtained by respectively addition-polymerizing a norbornene monomer represented by the formula [II-1]:

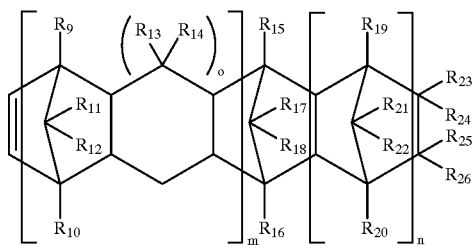

[II-1]

wherein the respective meanings of the reference characters are the same as defined in the formula [II], and a norbornene monomer represented by the formula [III-1]:

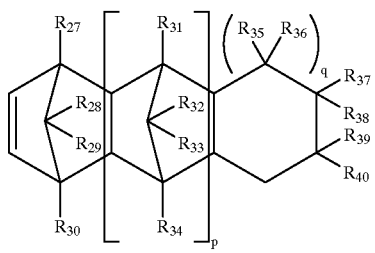

[III-1]

wherein the respective meanings of the reference characters are the same as defined in the formula [III].

The repeating unit (b) derived from the cycloolefin monomer (norbornene monomer) having no organic group having at least 4 carbon atoms at its side chain is more preferably a repeating unit represented by the formula [VII]:

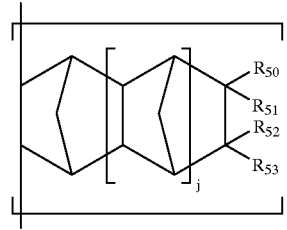

[VII]

wherein
j=0 or 1, and
$R_{50}$ to $R_{53}$=independently a hydrogen atom, a halogen atom, a substituent having at most 3 carbon atoms, or a substituent bonded to each other to form a monocycle or polycycle, said substituent may having carbon-carbon double bond(s); or
a repeating unit represented by the formula [VIII]:

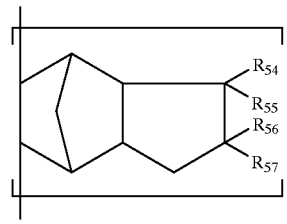

[VIII]

wherein
$R_{54}$ to $R_{57}$=independently a hydrogen atom, a halogen atom, a substituent having at most 3 carbon atoms, or a substituent bonded to each other to form a monocycle or polycycle, said substituent may having carbon-carbon double bond(s). Each R in these repeating units is preferably a hydrogen atom or an alkyl group having 1 to 3 carbon atoms.

These repeating units can be obtained by respectively addition-polymerizing a norbornene monomer represented by the formula [VII-1]:

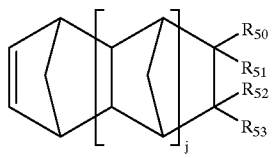

[VII-1]

wherein the respective meanings of the reference characters are the same as defined in the formula [VII], and a norbornene monomer represented by the formula [VIII-1]:

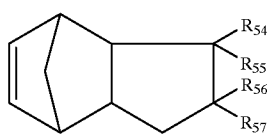

[VIII-1]

wherein the respective meanings of the reference characters are the same as defined in the formula [VIII].

The repeating unit (c) derived from the vinyl compound is preferably that represented by the formula [IX]:

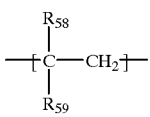

[IX]

wherein $R_{58}$ and $R_{59}$ are independently a hydrogen atom, alkyl group or aryl group. The alkyl group is preferably a short-chain alkyl group (having 1 to 3 carbon atoms) such as a methyl or ethyl group, and the aryl group is preferably a phenyl or substituted phenyl group. The substituent is preferably a short-chain alkyl group such as a methyl or ethyl group, or a halogen atom such as a chlorine or bromine atom.

The repeating unit (c) derived from the vinyl compound can be obtained by addition-polymerizing a vinyl compound represented by the formula [IX-1]:

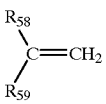

[IX-1]

wherein the respective meanings of the reference characters are the same as defined in the formula [IX].

The modified cycloolefin addition polymer according to the present invention is preferably that obtained by graft-reacting the above-described cycloolefin addition polymer with an unsaturated compound having a functional group. As unsaturated compounds having a functional group, may be mentioned a vinyl compound (d) having a functional group and a cycloolefin having a functional group.

The vinyl compound having a functional group is a vinyl-terminated compound represented by the formula [IV]:

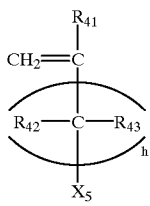

[IV]

wherein h=0 or an positive integer, $R_{41}$ to $R_{43}$=independently a hydrogen atom, a halogen atom, or a hydrocarbon group having 1 to 20 carbon atoms, and $X_5$=a substituent having at least one functional group of epoxy, hydroxyl, carboxyl, carbonyl, alkoxy, alkoxycarbonyl, silyl, nitrile, amino, amide and carbonyloxy groups.

The cycloolefin (e) having a functional group is represented by the formula [V]:

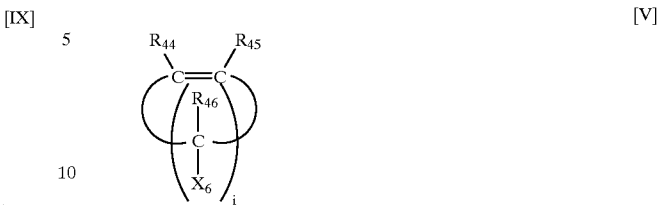

[V]

wherein i=an positive integer of 1 to 20, $R_{44}$ to $R_{46}$=independently a hydrogen atom, a halogen atom, or a hydrocarbon group having 1 to 20 carbon atoms, with the proviso that some of i $R_{46}$ groups may be bonded to each other to form a further ring, and $X_6$=a substituent having at least one functional group of epoxy, hydroxyl, carboxyl, carbonyl, alkoxy, alkoxycarbonyl, silyl, nitrile, amino, amide and carbonyloxy groups, or a hydrogen atom, a halogen atom or a substituent having 1 to 20 carbon atoms, with the proviso that at least one of i $X_6$ groups is the substituent having said functional group.

Specific examples of these unsaturated compounds having a functional group are as described above. The carbon-carbon double bond in these unsaturated compounds having a functional group is additionally polymerized by a graft reaction. The degree of polymerization is generally of the order of 1 to 30, preferably 1 to 20. Since the cycloolefin addition polymer is considered to have many graft-reactive sites, the position at which the unsaturated compound having a functional group graft-reacts with the cycloolefin addition polymer is optional and is not particularly limited.

When carbon-carbon unsaturated bonds are present in the cycloolefin addition polymer, a modified cycloolefin addition polymer can be provided by modifying the unsaturated bonds to add a functional group or bonding a compound having a functional group to the unsaturated bonds, thereby introducing the functional group into the addition polymer.

(Hardening Agent)

A hardening agent is incorporated into the modified cycloolefin addition polymer according to the present invention to prepare a curable resin composition, whereby when the resin composition is used as, for example, an interlayer insulating film, the film can be provided as a film which is excellent in heat resistance and chemical resistance and reduced in coefficient of linear expansion.

No particular limitation is imposed on the hardening agent used in the present invention so far as it is that generally used in crosslinking of organic compounds such as high-molecular compounds as a crosslinking agent or in curing (hardening) of thermosetting resins such as epoxy resins and urethane resins. Hardening agents are roughly classified into hardening agents which generate a radical to develop the effect, and hardening agents which form an ion as an acid or base to develop the effect. The hardening agents are also classified into those which initiate a crosslinking or curing reaction by energy of heat, light such as ultraviolet light, electron rays, and the like.

The hardening agents which generate a radical to develop the effect include organic peroxides, quinone and quinone dioxime derivatives, azo compounds, etc.

The hardening agents which form an ion to develop the effect include phenol resins, amino resins, halogen compounds, amine and aziridine compounds, isocyanate compounds, carboxylic acids and anhydrides thereof, aldehydes, alcohols, epoxy compounds, metal oxides, peroxides, sulfides, metal halides and organometal halides, metal salts of organic acids, metal alkoxides, organometallic compounds, silane compounds, epoxy resin-hardening agents, etc.

Of the above-described hardening agents, the hard hardening agents which form an ion to develop the effect are preferred for reasons of enhancement of crosslinking reaction efficiency and crosslinking density, and the like, with the amine and aziridine compounds, isocyanate compounds, carboxylic acids and anhydrides thereof, aldehydes, and alcohols being particularly preferred.

The hardening agents will hereinafter be illustrated with examples of individual groups.

[Hardening Agent Capable of Developing the Effect by Heat]

Hardening agents capable of developing the effect mainly by thermal energy can be classified into (1) those which form a radical to develop the effect and (2) those which form an ion to develop the effect.

(1) Hardening Agent which Forms a Radical to Develop the Effect a) Organic peroxide:

An organic peroxide generates a radical by thermal energy in particular to crosslink an organic compound.

Specific examples thereof include ketone peroxides such as methyl ethyl ketone peroxide and cyclohexanone peroxide; peroxyketals such as 1,1-bis(t-butyl peroxy)-3,3,5-trimethylcyclohexane and 2,2-bis(t-butyl peroxy)butane; hydroperoxides such as t-butyl hydroperoxide and 2,5-dimethylhexane-2,5-dihydroperoxide; dialkyl peroxides such as dicumyl peroxide, 2,5-dimethyl-2,5-di(t-butyl peroxy)hexyne-3 and α,α'-bis(t-butyl peroxy-m-isopropyl) benzene; diacyl peroxides such as octanoyl peroxide and isobutyryl peroxide; and peroxyesters such as peroxydicarbonate.

Of these, the dialkyl peroxides are preferred from the viewpoint of performance of the crosslinked resin. The kind of the alkyl group can be changed according to the forming or molding temperature.

b) Quinone and quinone dioxime derivatives:

Quinone and quinone dioxime derivatives crosslink an organic compound having a vinyl or vinylidene group, or another carbon-carbon unsaturated bond. Specific examples thereof include p-quinone and derivatives thereof; p-quinone dioxime and p-quinone dioxime dibenzoate; and nitroso compounds such as p-nitrosophenol and p-nitrosoaniline.

c) Azo compound:

Examples of azo compounds include diazoaminobenzene, bisazidofomate, bisazo esters, bis(dioxotriazoline) derivatives and difluorodiazine.

(2) Hardening Agent which Forms an Ion to Develop the Effect

There are many kinds of hardening agents which form an ion to develop the effect. As examples thereof, may be mentioned the following hardening agents:

d) phenol resins; polyhydric phenol resins such as phenol novolak resins and cresol novolak resins; and amino resins obtained by addition-condensing an amino compound such as melamine, benzoguanamine with formaldehyde or alcohol;

e) halogen compounds such as monohalogen compounds; dihalogen compounds; α,ω-dihaloalkanes; and polyhalides such as trichloromelamine, hexachlorocyclopentadiene, octachlorocyclopentadiene, trichloromethane sulfochloride and benzotrichloride;

f) amines such as mono-, di- and triethanolamines, N-(2-aminoethyl) piperazine, hexamethylenediamine and polyamine; and aziridine compounds;

g) diisocyanates such as hexamethylene diisocyanate and toluylene diisocyanate; dimers and trimers of diisocyanates; polyisocyanates such as adducts of diols or triols with diisocyanates; and blocked isocyanates with the isocyanate moiety of diisocyanate or polyisocyanate protected with a blocking agent;

h) acid anhydrides such as phthalic anhydride, pyromellitic anhydride, benzophenonetetracarboxylic acid anhydride, nadic anhydride, 1,2-cyclohexanedicarboxylic acid anhydride, maleic anhydride-modified polypropylene and maleic anhydride-modified cycloolefin resins; and dicarboxylic acids such as fumaric acid, phthalic acid, maleic acid, trimellitic acid and himic acid;

i) aldehydes such as formaldehyde and dialdehyde;

j) alcohols such as diols, polyols and bisphenols; diols such as 1,3'-butanediol, 1,4'-butanediol, hydroquinonedihydroxydiethyl ether, tricyclodecanediol and diphenylsilazanediol; triols such as 1,1,1-trimethylolpropane; and polyhydric alcohols such as ethylene glycol and derivatives thereof, diethylene glycol and derivatives thereof, and triethylene glycol and derivatives thereof;

k) diepoxy compounds;

l) metal oxides such as zinc oxide, zinc peroxide and lead oxide, and peroxides of zinc, lead, calcium, manganese, etc.;

m) metal halides and organometal halides such as zinc chloride, iron (III) chloride, dicyclopentadiene metal (Ti, Zr, Hf) dihalides, tin (II) chloride as a Lewis acid, tin (IV) chloride and iron (III) chloride;

n) metal alkoxides such as alkoxides of Ti, Zr and Al, and aluminum trialkoxide; organometal salts such as copper acetylacetone, aluminum stearate and chromium stearate; and organometallic compounds such as dibutyltin oxide;

o) silane compounds such as acetoxysilane, alkoxysilane, ketoximesilane, aminosilane, aminoxysilane and silane coupling agents;

p) epoxy resin-hardening agents;

q) polyamides such as nylon 6, nylon 66, nylon 610, nylon 11, nylon 612, nylon 12, nylon 46, methoxymethylated polyamide, polyhexamethylenediamine terephthalamide and polyhexamethylene isophthalamide; and r) bisazides such as 4,4-bisazidobenzal(4-methyl) cyclohexanone, 4,4'-diazidochalcone, 2,6-bis(4'-azidobenzal)cyclohexanone, 2,6-bis(4'-azidobenzal)-4-methylcyclohexanone, 4,4'-diazidodiphenyl sulfone, 4,4'-diazidodiphenylmethane and 2,2'-diazidostilbene.

Of these, p) the epoxy resin-hardening agents include those of various kinds. As examples thereof, may be mentioned aliphatic polyamines such as diethylenetriamine (DETA), triethylenetetramine (TEDA), tetraethylenepentamine (TEPA), diethylaminopropylamine (DEAPA) and hexamethylenediamine (HMDA); modified aliphatic polyamines; aromatic polyamines such as 4,4'-diaminodiphenyl ether, 4,4'-diaminodiphenylmethane (DDM), α,α'-bis(4-aminophenyl)-1,3-diisopropylbenzene, α,α'-bis(4-aminophenyl)-1,4-diisopropylbenzene, m-phenylenediamine, diaminodiphenyl sulfone (DDS), m-xylenediamine (MXDA), m-aminobenzylamine (MABA), benzidine, 4-chloro-o-phenylenediamine (CPDA), bis(3,4-diaminophenyl)sulfone (DAPS), 4,4'-diaminodiphenyl sulfone and 2,6-diaminopyridine (DAPy); modified aromatic polyamines; alicyclic polyamines such as diaminocyclohexane, 3(4),8(9)-bis(aminomethyl)tricyclo[5,2,1,0$^{2,6}$]decane, 1,3-(diaminomethyl)cyclohexane, menthenediamine, isophoronediamine, N-aminoethylpiperazine, bis(4-amino-3-methylcyclohexyl)methane, bis(4-aminocyclohexyl)methane, 3,3'-dimethyl-4,4'-diaminodicyclohexylmethane and N-aminoethylpiperazine; modified alicyclic polyamines; polyamidoamines; modified polyamidoamines; tertiary amines such as benzylmethylamine and 2,4,6-trisdimethylaminomethylphenol; urea-melamine-formaldehyde condensates; aliphatic acids and anhydrides thereof such as dodecenyl succinic anhydride (DDS); alicyclic acids and anhydrides thereof such as tetrahydrophthalic anhydride, hexahydrophthalic anhydride and methylendomethylenetetrahydrophthalic anhydride; aromatic acids and anhydrides thereof such as phthalic anhydride; halogenoacids and anhydrides thereof; dicyanediamide and derivatives thereof; boron halide complex salts ($BF_3$-amine complex compounds); organometallic compounds; polythiols; phenol and derivatives thereof; isocyanates such as polyfunctional aromatic isocyanates, aromatic diisocyanates, polyfunctional aromatic polyisocyanates and polyfunctional aliphatic isocyanates; blocked isocyanates; ketimines; and imidazole and derivatives thereof such as 2-methylimidazole, 2-ethyl-4-methylimidazole, 2-ethylimidazole and 2,4-dimethylimidazole.

These hardening agents may be used either singly or in any combination thereof. Of these, the aromatic polyamines, acid anhydrides, polyhydric phenols and polyhydric alcohols are preferred for reasons of excellent solvent resistance, heat resistance, mechanical strength, adhesion to metals and dielectric properties (low dielectric constant and low dielectric loss tangent) of the resulting cured product, with 4,4'-diaminodiphenylmethane (aromatic polyamine), maleic anhydride-modified cycloolefin resins (acid anhydride) and polyhydric phenols being particularly preferred.

No particular limitation is imposed on the amount of the hardening agent blended. From the viewpoints of being able to efficiently conduct a crosslinking reaction and improve the physical properties of the resulting cured product, and being profitable, however, the hardening agent is used within a range of generally 0.1 to 30 parts by weight, preferably 1 to 20 parts by weight per 100 parts by weight of the modified cycloolefin addition polymer. If the amount of the hardening agent is too little, the resulting composition becomes hard to undergo crosslinking, and so sufficient heat resistance and solvent resistance cannot be imparted to the composition. To the contrary, any amount too great results in a crosslinked polymer lowered in properties such as water absorption property and dielectric properties. It is hence not preferred to use the hardening agent in any amount outside the above range. The blending amount within the above range is preferred because these properties are balanced with each other at a high level.

As needed, a hardening accelerator may also be blended to enhance the efficiency of the crosslinking reaction. Examples of the hardening accelerator include amines such as pyridine, benzyldimethylamine, triethanolamine, triethylamine, tributylamine, tribenzylamine, dimethylformamide and imidazoles. The hardening accelerator is added in order to regulate curing rate and further enhance the efficiency of the crosslinking reaction. No particular limitation is imposed on the amount of the hardening accelerator blended. However, it is used within a range of generally 0.1 to 30 parts by weight, preferably 1 to 20 parts by weight per 100 parts by weight of the modified cycloolefin addition polymer. The blending amount of the hardening accelerator within this range is preferred because crosslinking density, dielectric properties, water absorptivity and the like of the crosslinked polymer are balanced with one another at a high level. Among others, imidazoles are preferred in that a cured polymer excellent in dielectric properties can be provided.

[Hardening Agent Capable of Developing the Effect by Light]

No particular limitation is imposed on the hardening agent capable of developing the effect by light so far as it is a photoreactive substance which reacts with the modified cycloolefin addition polymer by irradiation of actinic rays such as ultraviolet rays such as g rays, h rays or i rays, far ultraviolet rays, X rays, or electron rays to form a crosslinked compound. Hardening agents capable of developing the effect by light can be classified into (1) those which form a radical to develop the effect, (2) those which form an ion to develop the effect, and (3) a mixes system thereof. Examples thereof include aromatic bisazide compounds, photo-induced amine generators and photo-induced acid generators.

(1) Hardening Agent which Forms a Radical to Develop the Effect

Hardening agents capable of generating a radical mainly by light energy such as ultraviolet light to develop the effect include photo-induced radical polymerization initiators. They are generally excited in a near ultraviolet region of 300 to 450 to generate a radical. As specific examples thereof, may be mentioned benzoin compounds such as benzoin, benzyl and benzoin ethers (methyl, ethyl, isobutyl, n-butyl ethers, etc.); azo compounds such as azobisisobutyronitrile (AIBA), 2,2'-azobispropane, m,m'-azoxystyrene and hydrazone; diphenyl sulfide compounds such as diphenyl-mono-disulfide, dibenzyl-mono-disulfide and dibenzoyl-di-sulfide; organic peroxide compounds such as benzoyl peroxide, di-t-butyl peroxide, cyclic peroxides and 1- or 2-naphthoyl peroxide; organic pigment compounds such as acetyl-peroxide-anthracene or naphthalene, fluorenone peroxide-fluorene and benzoyl peroxide-chlorophyll; and iron-phthalocyanine compounds.

(2) Hardening Agent which Forms an Ion to Develop the Effect

Hardening agents capable of forming an ion to develop the effect include photo-induced base (amine) generators and photo-induced acid generators.

Specific examples of the photo-induced base (amine) generators include o-nitrobenzyloxycarbonylcarbamates, 2,6-dinitrobenzyloxycarbonylcarbamates and α,α-dimethyl-3,5-dimethoxybenzyloxycarbonylcarbamates of aromatic amines or aliphatic amines. More specifically, there may be mentioned o-nitrobenzyloxycarbonylcarbamates of aniline, cyclohexylamine, piperidine, hexamethylenediamine, triethylenetetramine, 1,3-(diaminomethyl)cyclohexane, 4,4'-diaminodiphenyl ether, 4,4'-diaminodiphenylmethane, phenylenediamine and the like. These compounds may be used either singly or in any combination thereof.

The photo-induced acid generator is a substance which forms a Brønsted acid or Lewis acid upon exposure to actinic rays. Examples thereof include onium salts, halogenated organic compounds, quinonediazide compounds, α,α-bis(sulfonyl)diazomethane compounds, α-carbonyl-α-sulfonyl-diazomethane compounds, sulfone compounds, organic acid ester compounds, organic acid amide compounds and organic acid imide compounds. These compounds, which cleave upon exposure to the actinic rays to form an acid, may be used either singly or in any combination thereof.

The combined hardening agents of the above-described hardening agents (1) and (2) include aromatic bisazide compounds which form a (base) amine once through a radical, or form a base (amine) by absorbing water in the system. Specific typical examples thereof include 4,4'-diazidochalcone, 2,6-bis(4'-azidobenzal)cyclohexanone, 2,6-bis(4'-azidobenzal)-4-methylcyclohexanone, 4,4'-diazidodiphenyl sulfone, 4,4'-diazidobenzophenone, 4,4'-diazidodiphenyl, 2,7-diazidofluorene and 4,4'-diazidophenylmethane. These compounds may be used either singly or in any combination thereof.

No particular limitation is imposed on the amount of these photoreactive compounds added. From the viewpoints of being able to efficiently conduct the reaction with the modified cycloolefin addition polymer, not impairing the physical properties of the resulting crosslinked resin, and being profitable, however, the photoreactive compound is used within a range of generally 0.1 to 30 parts by weight, preferably 1 to 20 parts by weight per 100 parts by weight of the polymer. If the amount of the photoreactive substance added is too little, the resulting composition becomes hard to undergo crosslinking, and so sufficient heat resistance and solvent resistance cannot be imparted to the composition. On the other hand, any amount too great results in a crosslinked polymer lowered in properties such as water absorption property and dielectric properties. It is hence not preferable to use the photoreactive compound in any amount outside the above range. Therefore, the blending amount within this range is preferred because these properties are balanced with one another at a high level.

Into the curable polymer composition according to the present invention, may be blended a hardening aid (auxiliary) in addition to the hardening agent if desired.

No particular limitation is imposed on the hardening aid. Publicly known compounds disclosed in Japanese Patent Application Laid-Open No. 34924/1987 and the like may be used. Examples thereof include oxime.nitroso type hardening aids such as quinone dioxime, benzoquinone dioxime and p-nitrosophenol; maleimide type hardening aids such as N,N-m-phenylenebismaleimide; allyl type hardening aids such as diallyl phthalate, triallyl cyanurate and triallyl isocyanurate; methacrylate type hardening aids such as ethylene glycol dimethacrylate and trimethylolpropane trimethacrylate; and vinyl type hardening aids such as vinyltoluene, ethylvinylbenzene and divinylbenzene. Of these, the allyl type hardening aids and methacrylate type hardening aids are preferred because they are easy to be uniformly dispersed.

The amount of the hardening aid blended is suitably selected according to the kind of the hardener used. However, it is generally 0.1 to 10 parts by weight, preferably 0.2 to 5 parts by weight per part by weight of the hardener. If the amount of the hardening aid blended is too little, the resulting composition becomes hard to undergo curing. On the other hand, any amount too great results in a crosslinked resin having a possibility that its electrical properties, moisture resistance and the like may be deteriorated.

(Blending Process of Hardening Agent)

The modified cycloolefin addition polymer according to the present invention is uniformly mixed with the hardening agent, and the hardening accelerator and hardening aid which are added as needed, or other additives which will be described subsequently, to prepare a curable resin composition. As a process for uniformly dispersing the hardening agent in the modified cycloolefin addition polymer, there is a process in which the polymer, hardening agent and other additives are uniformly dissolved or dispersed in a solvent which can dissolve the polymer therein, and the solvent is then removed.

The solvent for the modified cycloolefin addition polymer is preferably a solvent which is inert to the polymer and the hardening agent and can be easily removed. Specific examples thereof include cyclohexane, toluene, xylene, ethylbenzene, trimethylbenzene, chlorobenzene, cyclohexanone, methyl ethyl ketone, decalin and tetralin.

[Additives]

Into the curable resin composition according to the present invention, may be blended such additives as described below.

(1) Flame Retardant

A flame retardant is not an essential component. However, it is preferred that the flame retardant be added to the curable resin composition when the composition is used for electronic parts in particular. No particular limitation is imposed on the flame retardant. However, those which undergo none of decomposition, denaturation and deterioration by the hardening agent are preferred. Halogen-containing flame retardants are generally used.

Various kinds of chlorine- or bromine-containing flame retardants may be used as the halogen-containing flame retardants. From the viewpoints of flameproofing effect, heat resistance upon forming or molding, dispersibility in resins and influence on the physical properties of the resins, however, the following flame retardants may be preferably used. Namely, preferable examples thereof include hexabromobenzene, pentabromoethylbenzene, hexabromobiphenyl, decabromodiphenyl, hexabromodiphenyl oxide, octabromodiphenyl oxide, decabromodiphenyl oxide, pentabromocyclohexane, tetrabromobisphenol A and derivatives thereof [for example, tetrabromobisphenol A-bis (hydroxyethyl ether), tetrabromobisphenol A-bis(2,3-dibromopropyl ether), tetrabromobisphenol A-bis (bromoethyl ether), tetrabromobisphenol A-bis(allyl ether), etc.], tetrabromobisphenol S and derivative thereof [for example, tetrabromobisphenol S-bis(hydroxyethyl ether), tetrabromobisphenol S-bis(2,3-dibromopropyl ether), etc.], tetrabromophthalic anhydride and derivatives thereof [for example, tetrabromophthalimide, ethylenebistetrabromophthalimide, etc.], ethylenebis(5,6-dibromonorbornene-2,3-dicarboxyimide), tris-(2,3-dibromopropyl-1)isocyanurate, adducts of hexachlorocyclopentadiene by Diels-Alder reaction, tribromophenyl glycidyl ether, tribromophenyl acrylate, ethylenebistribromophenyl ether, ethylenebispentabromophenyl ether, tetradecabromodiphenoxybenzene, brominated polystyrene, brominated polyphenylene oxide, brominated epoxy resins, brominated polycarbonate, polypentabromobenzyl acrylate, octabromonaphthalene, hexabromocyclododecane, bis (tribromophenyl)fumaramide and N-methylhexabromodiphenylamine.

Examples of phosphorus-containing flame retardants include halogen-containing phosphoric ester flame retardants such as tris(chloroethyl)phosphate, tris(2,3-dichloropropyl)phosphate, tris(2-chloropropyl)phosphate, tris(2,3-bromopropyl)phosphate, tris(bromochloropropyl) phosphate, 2,3-dibromopropyl-2,3-chloropropyl phosphate, tris(tribromophenyl)phosphate, tris(dibromophenyl) phosphate and tris(tribromoneopentyl)phosphate; and non-halogen-containing phosphoric ester flame retardants such as aliphatic phosphoric esters such as trimethyl phosphate, triethyl phosphate, tributyl phosphate, trioctyl phosphate and tributoxyethyl phosphate; and aromatic phosphoric esters such as triphenyl phosphate, cresyldiphenyl phosphate, dicresylphenyl phosphate, tricresyl phosphate, trixylyl phosphate, xylenyldiphenyl phosphate, tri (isopropylphenyl) phosphate, isopropylphenyldiphenyl phosphate, diisopropylphenyl phosphate, tri(trimethylphenyl)phosphate, tri(t-butylphenyl)phosphate, hydroxyphenyldiphenyl phosphate and octyldiphenyl phosphate, The amount of the flame retardant added is generally 3 to 150 parts by weight, preferably 10 to 140 parts by weight, particularly preferably 15 to 120 parts by weight per 100 parts by weight of the modified cycloolefin addition polymer.

As a flame retardant auxiliary for causing the flame retardant to more effectively exhibit its flameproofing effect, for example, an antimonial flame retardant auxiliary such as antimony trioxide, antimony pentoxide, sodium antimonate or antimony trichloride may be used. These flame retardant auxiliaries are used in a proportion of generally 1 to 30 parts by weight, preferably 2 to 20 parts by weight per 100 parts by weight of the flame retardant.

(2) Other Polymer Components

In the present invention, rubbery polymers and other thermoplastic resins may be blended into the curable resin compositions, as needed, for the purpose of imparting flexibility and the like to the resin compositions.

The rubbery polymers are polymers having a glass transition temperature of ordinary temperature (25° C.) or lower and include general rubber-like polymers and thermoplastic elastomers. The Mooney viscosity ($ML_{1+4}$, 100° C.) of such a rubbery polymer is suitably selected as necessary for the end application intended and is generally 5 to 200.

Examples of the rubber-like polymers include ethylene-α-olefin type rubbery polymers; ethylene-α-olefin-polyene terpolymer rubbers; copolymers of ethylene and an unsaturated carboxylic acid ester, such as ethylene-methyl methacrylate copolymers and ethylene-butyl acrylate copolymers; copolymers of ethylene and a fatty acid vinyl ester, such as ethylene-vinyl acetate copolymers; polymers of acrylic acid alkyl esters such as ethyl acrylate, butyl acrylate, hexyl acrylate, 2-ethylhexyl acrylate and lauryl acrylate; diene rubbers such as polybutadiene, polyisoprene, styrene-butadiene or styrene-isoprene random copolymers, acrylonitrile-butadiene copolymers, butadiene-isoprene copolymers, butadiene-alkyl (meth)acrylate copolymers, butadiene-alkyl (meth)acrylate-acrylonitrile terpolymers and butadiene-alkyl (meth)acrylate-acrylonitrile-styrene tetrapolymers; and butylene-isoprene copolymers.

As examples of the thermoplastic elastomers, may be mentioned aromatic vinyl-conjugated diene block copolymers such as styrene-butadiene block copolymers, hydrogenated styrene-butadiene block copolymers, styrene-isoprene block copolymers and hydrogenated styrene-isoprene block copolymers, low crystalline polybutadiene resins, ethylene-propylene elastomers, styrene-grafted ethylene-propylene elastomers, thermoplastic polyester elastomers, and ethylenic ionomer resins. Of these thermoplastic elastomers, the hydrogenated styrene-butadiene block copolymers and hydrogenated styrene-isoprene block copolymers are preferred. As specific examples thereof, may be mentioned those described in Japanese Patent Application Laid-Open Nos. 133406/1990, 305814/1990, 72512/1991 and 74409/1991, etc.

Examples of the other thermoplastic resins include low density polyethylene, high density polyethylene, linear low density polyethylene, very low density polyethylene, ethylene-ethyl acrylate copolymers, ethylene-vinyl acetate copolymers, polystyrene, poly(phenylene sulfide), poly(phenylene ether), polyamide, polyester, polycarbonate and cellulose triacetate.

These other polymer components may be used either singly or in any combination thereof. The blending amount thereof is suitably selected within limits not impeding the objects of the present invention. However, it is preferably at most 30 parts by weight per 100 parts by weight of the modified cycloolefin polymer for reasons of not impeding the properties of the resulting insulating material.

(3) Other Compounding Additives

To the curable resin compositions according to the present invention, may be added proper amounts of other compounding additives such as heat stabilizers, weathering stabilizers, leveling agents, antistatic agents, slip agents, antiblocking agents, anti-fogging agents, lubricants, dyes, pigments, natural oil, synthetic oil and wax as needed.

Specific examples thereof include phenolic antioxidants such as tetrakis[methylene-3(3,5-di-t-butyl-4-hydroxyphenyl)propionate]methane, alkyl β-(3,5-di-t-butyl-4-hydroxyphenyl)propionates and 2,2'-oxamidobis-[ethyl-3(3,5-di-t-butyl-4-hydroxyphenyl)propionate]; phosphoric stabilizers such as trisnonylphenyl phosphate, tris(2,4-di-t-butylphenyl)phosphite and tris(2,4-di-t-butylphenyl) phosphite; fatty acid metal salts such as zinc stearate, calcium stearate and calcium 12-hydroxystearate; polyhydric alcohol fatty acid esters such as glycerol monostearate, glycerol monolaurate, glycerol distearate, pentaerythritol monostearate, pentaerythritol distearate and pentaerythritol tristearate; synthetic hydrotalcite; amine type antistatic agents; leveling agents for paints, such as fluorine-containing nonionic surfactants, special acrylic resin type leveling agents and silicone type leveling agents; coupling agents such as silane coupling agents, titanate coupling agents, aluminum-containing coupling agents and zircoaluminate coupling agents; plasticizers; and colorants such as pigments and dyes.

(Insulating Material)

The curable resin compositions according to the present invention are useful as, for example, insulating materials used for boards (substrates) for mounting electronic parts, and the like. The insulating material is generally used in the form of a varnish by dissolving the curable resin composition comprising the modified cycloolefin polymer in a solvent.

Examples of the solvent used at this time include aromatic hydrocarbons such as toluene, xylene and ethylbenzene; aliphatic hydrocarbons such as n-pentane, hexane and heptane; alicyclic hydrocarbons such as cyclohexane; and halogenated hydrocarbons such as chlorobenzene, dichlorobenzene and trichlorobenzene.

The solvent is used in an amount sufficient to uniformly dissolve or disperse the cycloolefin polymer and the individual components optionally blended therein. The amount is generally controlled in such a manner that a solids concentration amounts to 1 to 80 wt. %, preferably 5 to 60 wt. %, more preferably 10 to 50 wt. %.

In the present invention, the above-described varnish may also be used in the form of a film (including a sheet) formed by a solution casting process or a metal foil-attached film formed by coating a thin metal film such as copper with the varnish. Further, the varnish may be used in the form of a prepreg by impregnating a reinforcing base material with the varnish.

When the insulating material according to the present invention is used in the form of a prepreg, it is useful as an insulating material for printed wiring boards or an insulating material for package boards on which semiconductor chips are directly mounted. It is improved in impregnating property upon impregnating, particularly, a glass cloth therewith by its excellent solution viscosity characteristics and moreover in durability in a heat cycle test (TCT) and a pressure cooker test (PCT) by its excellent mechanical properties when it is used in package boards which will be subjected to a hard reliability test.

When the curable resin composition is used in the form of the varnish or film, it is useful as an interlayer insulating film in a high-density multi-layer interconnection layer on a high-density assembly board (particularly, a sequential lamination (build-up) multi-layer interconnection board), and the insulating film is improved in reliability, processability and forming or molding ability by its excellent mechanical properties and solution viscosity characteristics.

The interlayer insulating film for the high-density assembly board may be formed by either curing by heat or curing by light in the above-described form of the curable polymer composition.

As described above, the curable resin composition according to the present invention can be dissolved in an organic solvent and then formed into a film by a coating or casting method. This film may be used either as a protective film or insulating film by coating a substrate or as a film itself. When the film is used as an insulating film, a conductive layer may be formed thereon to use the resulting laminate composed of at least two layers.

The concentration of the curable resin composition upon the formation of a film from a solution is suitably selected according to the thickness of the film formed. However, it is generally 1 to 80 wt. %, preferably 10 to 70 wt. %, more preferably 20 to 50 wt. %. The concentration of the solution within this range is preferred because its film-forming property and surface accuracy are balanced with each other. The film may also be formed by a melt extrusion method. Processes such as dissolution of the curable resin composition in the solvent, removal of the solvent, melting and mixing, and melt forming or molding are conducted under temperature conditions that the hardening agent is not activated, or a curing rate is sufficiently slow. It is preferred that a hardening agent suitable for the respective processes be selected.

The film formed may be subjected to a curing reaction by a method such as curing by light or curing by heat according to the kind of the hardening agent used to form a cured film. The curing temperature is generally 100 to 400° C., preferably 120 to 350° C., more preferably 150 to 300° C.

The thus-obtained film does not undergo cracking after the curing because the polymer has excellent flexibility, and so a thick film may be formed. The thickness of the film is generally 1 to 1,000 $\mu$m, preferably 5 to 500 $\mu$m, more preferably 20 to 200 $\mu$m. In particular, when the curable resin composition according to the present invention is used, a film having a thickness of at least 20 $\mu$m can be formed, so that a film having a thickness required of a usually used insulating film for printed boards can be formed. A conductive layer is formed on the film to used the laminate as an insulating film or the like, excellent migration resistance and insulation reliability are effectively achieved.

[Uses]

The curable resin compositions according to the present invention can be used in various application fields making good use of their excellent dielectric properties, and excellent solvent resistance, chemical resistance and heat resistance after their curing, and are useful, in particular, as insulating materials, sealing materials, protective film materials and the like in an electric and electronic field.

Specific examples of uses include insulating materials for electronic parts, such as insulating varnishes for copper-clad laminates of printed wiring boards, interlayer insulating films in build-up (sequential lamination) multi-layer interconnection layers of high-density assembly boards, and insulating materials for semiconductor package boards; sealing materials such as sealing materials for transfer molding of semiconductor parts such as LSI and IC, liquid sealing materials and sealing materials for underfilling; and protective films such as buffer coating films, passivation films, protective films for $\alpha$-ray shielding, solder resists, cover coating films and overcoating films

EXAMPLES

The present invention will hereinafter be described more specifically by the following Examples and Comparative Examples. All designations of "part" or "parts" and "%" as will be used in these examples mean part or parts by weight and wt. % unless expressly noted. Various physical properties were determined in accordance with the following methods:

(1) The glass transition temperature was measured in accordance with the differential scanning calorimetry (DSC method).
(2) The molecular weight was determined in terms of polystyrene as measured by gel permeation chromatography (GPC) using toluene as a solvent unless expressly noted.
(3) The copolymerization ratio was determined by $^1$H-NMR.
(4) The epoxy group content was determined by $^1$H-NMR.
(5) The carboxyl group content was determined by $^1$H-NMR.
(6) The hydroxyl group content was determined by $^1$H-NMR.
(7) A pressure cooker test (PCT) was conducted by placing a sample in a PCT tester to hold it for 20 hours under conditions of 160° C. in temperature and 4 atm, thereby evaluating the sample as to reliability at the high temperature. Since a sample on which deformation and/or cracking has occurred during the process will become defective in a reliability test, the percent defective thereof was determine.
(8) A temperature cycle test (TCT) was conducted by repeating a temperature cycle of "−55° C. (30 min) →room temperature (5 min)→160° C. (30 min)→room temperature (5 min)" 500 times to apply temperature shock to a test sample, thereby investigating whether cracking occurred or not. Since a sample on which deformation and/or cracking has occurred during the process will become defective in a reliability test due to increase in cracks, the percent defective thereof was determine.
(9) The solution viscosity of a sample was measured at 25° C. in the form of a 30% xylene solution by means of an E-type viscometer in accordance with JIS Z 8803.
(10) The adhesion property to a metal was determined by subjecting a cured film formed on a copper-clad silicon wafer to a cross-cut adhesion test in accordance with JIS K 5400.
(11) Tensile strength and tensile elongation were determined by cutting a film formed by applying a xylene solution of a curable resin composition to a polytetrafluoroethylene having a flat surface, prebaking the solution at 70° C. for 1 hour and then curing the resin by heating at 200° C. for 1 hour in a nitrogen atmosphere into a strip-like specimen 10 mm wide and 80 mm long, and then measuring the tensile shear strength of the specimen at a cross-head speed of 2 mm/min by means of an Autograph AGS-5KNG manufactured by Shimadzu Corporation.

Example 1

(Polymerization)

A glass container purged with nitrogen was charged with 150 parts of toluene, 50 parts of a 67% toluene solution of 2-norbornene (NB) and 35 parts of 5-decyl-2-norbornene (DNB). Then, 10 parts of a toluene solution (2.5 mmol/l) of nickel acetylacetonate and 10 parts of a toluene solution (500 mmol/l) of ethylaluminum dichloride were added to conduct a polymerization reaction at 50° C. for 5 hours. After completion of the reaction, the reaction mixture was poured into a large amount of methanol to deposit a polymer formed. The polymer was collected by filtration, washed and then dried under reduced pressure, thereby obtaining 45 parts of an addition copolymer [number average molecular weight (Mn)=69,200, weight average molecular weight (Mw)=132,100, both, in terms of polystyrene; compositional ratio NB/DNB of monomers=76/24 (molar ratio); Tg=260° C.].

(Epoxy Modification)

Dissolved in 130 parts of t-butylbenzene were 28 parts of the thus-obtained NB/DNB addition copolymer, 10 parts of 5,6-epoxy-1-hexene and 2 parts of dicumyl peroxide, and a reaction was conducted at 140° C. for 6 hours. The thus-obtained solution of a reaction product was poured into 300 parts of methanol to solidify the reaction product. The epoxy-modified polymer thus solidified was dried under reduced pressure at 100° C. for 20 hours, thereby obtaining 26 parts of an epoxy-modified NB/DNB addition copolymer. This modified polymer had Mn of 72,600, Mw of 141,400 and Tg of 275° C. The epoxy group content in the modified polymer was 2.4% per repeating structural unit of the polymer as measured by $^1$H-NMR.

(Blending)

When 15 parts of the epoxy-modified NB/DNB addition copolymer and 0.6 parts of 4,4'-bisazidobenzal(4-methyl)cyclohexane as a crosslinking agent were dissolved in 45 parts of xylene, a uniform solution was provided without forming any precipitate. The solution viscosity thereof was 520 cps.

(Formation of Film)

The above solution was filtered through a precision filter made of polytetrafluoroethylene (PTFE) having a pore size of 0.22 μm to obtain a curable resin composition. After the solution thus obtained was coated on a copper-clad silicon wafer substrate 4 inches in size by means of a spinner, it was prebaked at 90° C. for 120 seconds and then cured by heating at 200° C. for 1 hour in a nitrogen atmosphere, thereby forming a uniform film having a thickness of 60 μm and no crack. As a result of a cross-cut adhesion test, no separation from the substrate was observed. The tensile strength and tensile elongation of a cured film produced on a PTFE plate were 45 MPa and 12.2% in terms of maximum stress at rupture and maximum elongation at break, respectively.

Example 2

(Polymerization)

Polymerization was conducted in the same manner as in Example 1 except that 50 parts of 5-hexyl-2-norbornene (HNB) were added in place of 35 parts of 5-decyl-2-norbornene, thereby obtaining 55 parts of an addition copolymer [number average molecular weight (Mn)=71,100, weight average molecular weight (Mw)=147,000, both, in terms of polystyrene; compositional ratio NB/HNB of monomers=60/40 (molar ratio); Tg=323° C.].

(Epoxy Modification)

Thirty parts of the thus-obtained NB/HNB addition copolymer and 10 parts of 5,6-epoxy-1-hexene were added to 120 parts of toluene and heated to 120° C. into a solution. To the solution were added 1.2 parts of t-butyl hydroperoxide and 0.09 parts of hexacarbonylmolybdenum, and the mixture was refluxed for 2 hours. The reaction mixture was poured into 100 parts of cold methanol to solidify a reaction product. The epoxy-modified polymer thus solidified was dried under reduced pressure at 80° C. for 20 hours, thereby obtaining 30 parts of an epoxy-modified NB/HNB addition copolymer. This epoxy-modified copolymer had Mn of 72,200, Mw of 154,600 and Tg of 328° C. The epoxy group content in the copolymer was 3.0% per repeating structural unit of the polymer as measured by $^1$H-NMR.

(Blending)

When 15 parts of the epoxy-modified NB/HNB addition copolymer and 0.6 parts of 4,4'-bisazidobenzal(4-methyl)cyclohexane as a crosslinking agent were dissolved in 45 parts of xylene, a uniform solution was provided without forming any precipitate. The solution viscosity thereof was 2,820 cps.

(Formation of Film)

The above solution was filtered through a precision filter made of PTFE having a pore size of 0.22 μm to obtain a curable resin composition. After the solution thus obtained was coated on a copper-clad silicon wafer substrate 4 inches in size by means of a spinner, it was prebaked at 90° C. for 120 seconds and then cured by heating at 200° C. for 1 hour in a nitrogen atmosphere, thereby forming a uniform film having a thickness of 80 μm and no crack. As a result of a cross-cut adhesion test, no separation from the substrate was observed. The tensile strength and tensile elongation of a cured film produced on a PTFE plate were 40 MPa and 10.2% in terms of maximum stress at rupture and maximum elongation at break, respectively.

Comparative Example 1

(Polymerization)

Polymerization was conducted in the same manner as in Example 1 except that 80 parts of a 67% toluene solution of 2-norbornene (NB) were added in place of 50 parts of a 67% toluene solution of 2-norbornene (NB) and 35 parts of 5-decyl-2-norbornene (DNB), thereby obtaining 50 parts of an addition polymer [number average molecular weight (Mn)=62,200, weight average molecular weight (Mw)=123,800, both, in terms of polystyrene; Tg=360° C.].

(Epoxy Modification)

Dissolved in 130 parts of t-butylbenzene were 30 parts of the thus-obtained polynorbornene (NB addition polymer), 10 parts of 5,6-epoxy-1-hexene and 2 parts of dicumyl peroxide, and a reaction was conducted at 140° C. for 6 hours. The thus-obtained solution of a reaction product was poured into 300 parts of methanol to solidify the reaction product. The epoxy-modified polymer thus solidified was dried under reduced pressure at 100° C. for 20 hours, thereby obtaining 30 parts of epoxy-modified polynorbornene. This modified polymer had Mn of 75,600, Mw of 178,400 and Tg of 365° C. The epoxy group content in the modified polymer was 3.4% per repeating structural unit of the polymer as measured by $^1$H-NMR.

(Blending)

When 15 parts of the epoxy-modified polynorbornene and 0.6 parts of 4,4'-bisazidobenzal(4-methyl)cyclohexane as a crosslinking agent were dissolved in 45 parts of xylene, a uniform solution was provided without forming any precipitate. The solution viscosity thereof was 8,840 cps.

(Formation of Film)

The above solution was filtered through a precision filter made of PTFE having a pore size of 0.22 μm to obtain a curable resin composition. After the solution thus obtained was coated on a copper-clad silicon wafer substrate 4 inches in size by means of a spinner, it was prebaked at 90° C. for 120 seconds and then cured by heating at 200° C. for 1 hour in a nitrogen atmosphere. Separation of the thus-formed film from the copper-clad silicon wafer was not observed, but many cracks occurred. Therefore, the cross-cut adhesion test was not performed. Many cracks also occurred in a cured film formed on a PTFE plate. A portion having no crack was selected to measure its tensile strength and tensile elongation. As a result, it was found to be 20 MPa and 1.3% in terms of maximum stress at rupture and maximum elongation at break, respectively.

From the results of Examples 1 and 2 and Comparative Example 1, it was confirmed that the modified cycloolefin polymers according to the present invention are excellent in the mechanical properties (tensile strength and tensile elongation) of the formed products therefrom, solution viscosity characteristics and adhesion to metals compared with the conventional norbornene polymer.

Example 3
(Laminated Wiring Circuit Board)

The solution (curable resin composition) prepared in Example 1 was coated on a core substrate (A4-sized glass-epoxy 4-layer printed wiring board having a thickness of 0.6 mm) by means of a roll coater and prebaked at 80° C. for 90 seconds to form a coating film (insulating layer) having a film thickness of 40 μm. The coating film was exposed to ultraviolet light having light intensity of 150 mJ/cm² at 365 nm using a test pattern mask for formation of via holes and then developed with cyclohexane to form via holes 50 μm in diameter. The thus-treated coating film was then cured by heating at 220° C. for 4 hours under nitrogen in an oven. After the whole surface of the coating film was then plated with copper to form a copper layer 15 μm thick, a resist was applied thereto, exposed using a mask for wiring pattern and then developed. The thus-treated copper layer was etched by immersing the substrate in an aqueous solution of ammonium persulfate, and the resist was separated to obtain a laminate in which copper wiring had been formed.

The above steps, i.e., (1) the coating of the interlayer insulating layer, (2) the formation of the via holes, and (3) the formation of the copper wiring layer, were repeated to obtain a 3-layer laminated wiring circuit board. Various properties of the laminate thus obtained were evaluated. As a result, the laminate was found to have a dielectric constant of 2.5, a dielectric loss tangent of 0.0007 and a water absorptivity of 0.05%. The laminate was subjected to a PCT test and a heat cycle test in accordance with the respective methods described above. As a result, its percent defective was both 0%.

Example 4
(Polymerization)

An addition terpolymer of 2-norbornene (NB), 5-hexyl-2-norbornene (HNB) and ethylene [compositional ratio NB/HNB/ethylene of monomers=40/15/45 (mol %); Mn=43,200, Mw=122,400; Tg=145° C.] was obtained in accordance with the publicly known process described in Japanese Patent Application Laid-Open No. 292020/1995.
(Epoxy Modification)

Dissolved in 130 parts of t-butylbenzene were 30 parts of the thus-obtained NB/HNB/ethylene addition terpolymer, 10 parts of 5,6-epoxy-1-hexene and 2 parts of dicumyl peroxide, and a reaction was conducted at 140° C. for 6 hours. The thus-obtained solution of a reaction product was poured into 300 parts of methanol to solidify the reaction product. The epoxy-modified polymer thus solidified was dried under reduced pressure at 100° C. for 20 hours, thereby obtaining 29 parts of an epoxy-modified NB/HNB/ethylene addition terpolymer. This modified polymer had Mn of 48,400, Mw of 142,100 and Tg of 146° C. The epoxy group content in the modified polymer was 2.1% per repeating structural unit of the polymer as measured by $^1$H-NMR.
(Blending)

When 15 parts of the epoxy-modified NB/HNB/ethylene addition terpolymer and 0.6 parts of 4,4'-bisazidobenzal(4-methyl)cyclohexane as a crosslinking agent were dissolved in 45 parts of xylene, a uniform solution was provided without forming any precipitate.
(Laminated Wiring Circuit Board)

A laminated wiring circuit board was produced in the same manner as in Example 3 except that the uniform solution obtained above was used, and evaluated. As a result, the laminate was found to have a dielectric constant of 2.5, a dielectric loss tangent of 0.0007 and a water absorptivity of 0.05% like Example 3. The laminate was subjected to a PCT test and a heat cycle test in accordance with the respective methods described above. As a result, its percent defective was both 0%.

Example 5
(Polymerization)

Polymerization was conducted in the same manner as in Example 1 except that 18 parts of 5-hexyl-2-norbornene (HNB) and 3 parts of 5-ethylidene-2-norbornene (ENB) were added in place of 5-decyl-2-norbornene, thereby obtaining an addition terpolymer [number average molecular weight (Mn)=51,100, weight average molecular weight (Mw)=117,000, both, in terms of polystyrene; compositional ratio NB/HNB/ENB of monomers=74/23/3 (molar ratio); Tg=323° C.].
(Epoxy Modification)

Thirty parts of the thus-obtained NB/HNB/ENB addition terpolymer were added to 120 parts of toluene and heated to 120° C. into a solution. To the solution were added 1.2 parts of t-butyl hydroperoxide and 0.09 parts of hexacarbonylmolybdenum, and the mixture was refluxed for 2 hours. The reaction mixture was poured into 100 parts of cold methanol to solidify a reaction product. The epoxy-modified polymer thus solidified was dried under reduced pressure at 80° C. for 20 hours, thereby obtaining 30 parts of an epoxy-modified NB/HNB/ENB addition terpolymer. This modified terpolymer had Mn of 57,200, Mw of 134,600 and Tg of 326° C. The epoxy-modified rate to the unsaturated bonds was 100% as measured by $^1$H-NMR, and the epoxy group content in the polymer was 3.0% per repeating structural unit of the polymer.
(Blending)

When 15 parts of the epoxy-modified terpolymer and 0.6 parts of 4,4'-bisazidobenzal(4-methyl)cyclohexane as a crosslinking agent were dissolved in 45 parts of xylene, a uniform solution was provided without forming any precipitate.
(Laminated Wiring Circuit Board)

The uniform solution obtained above was coated on the same core substrate as that used in Example 3 by means of a roll coater in the same manner as in Example 3 and cured by heating at 200° C. for 4 hours to form a coating film having a thickness of 40 μm.

Via holes 50 μm in diameter were formed in the coating film thus obtained by means of a carbon dioxide laser. After the whole surface of the coating film was then plated with copper to form a copper layer 15 μm thick, a resist was applied thereto, exposed using a mask for wiring pattern and then developed. The thus-treated copper layer was etched by immersing the substrate in an aqueous solution of ammonium persulfate, and the resist was separated to obtain a laminate in which copper wiring had been formed.

The above steps, i.e., (1) the coating of the interlayer insulating layer, (2) the formation of the via holes, and (3) the formation of the copper wiring layer, were repeated to obtain a 3-layer laminated wiring circuit board. Various properties of the laminate thus obtained were evaluated. As a result, the laminate was found to have a dielectric constant of 2.6, a dielectric loss tangent of 0.0008 and a water absorptivity of 0.06% similarly to Example 3. The laminate was subjected to a PCT test and a heat cycle test in accordance with the respective methods described above. As a result, its percent defective was both 0%.

Example 6
(Maleic Acid Modification)

Thirty parts of the unmodified NB/DNB addition copolymer obtained in Example 1 were added to 150 parts of toluene and heated to 120° C. into a solution. To the solution were gradually added a solution of maleic anhydride (3 parts) in toluene (100 parts) and a solution of dicumyl peroxide (0.3 parts) in toluene (45 parts), thereby conducting a reaction for 4 hours. The reaction mixture was poured into 600 parts of cold methanol to solidify a reaction product. The modified polymer thus solidified was dried under reduced pressure at 80° C. for 20 hours, thereby obtaining 30 parts of a maleic acid-modified NB/DNB addition copolymer. This modified polymer had Mn of 73,100, Mw of 162,400 and Tg of 276° C. The maleic acid content in the modified polymer was 2.5% per repeating structural unit of the polymer as measured by $^1$H-NMR.
(Blending)

When 15 parts of the maleic acid-modified terpolymer and 1.1 parts of hexamethylene diisocyanate as a crosslinking agent were dissolved in 45 parts of xylene, a uniform solution was provided without forming any precipitate.
(Laminated Wiring Circuit Board)

A laminated wiring circuit board was produced in the same manner as in Example 5 except that the uniform solution obtained above was used, and evaluated. As a result, the laminate was found to have a dielectric constant of 2.5, a dielectric loss tangent of 0.0007 and a water absorptivity of 0.05% like Example 5. The laminate was subjected to a PCT test and a heat cycle test in accordance with the respective methods described above. As a result, its percent defective was both 0%.

Example 7
(Hydroxy Modification)

Thirty parts of the unmodified NB/HNB/ENB addition terpolymer obtained in Example 5 were added to 300 parts of toluene and heated to 120° C. into a solution. To the solution were gradually added dropwise 50 parts of 90% formic acid and 7.5 parts of 30% aqueous hydrogen peroxide, followed by refluxing for 2 hours. The reaction mixture was then neutralized with a methanol solution of sodium hydroxide and then poured into 700 parts of acetone to solidify a reaction product. The modified polymer thus solidified was dried under reduced pressure at 80° C. for 20 hours, thereby obtaining 30 parts of a hydroxy-modified NB/HNB/ENB addition terpolymer. This modified polymer had Mn of 56,100, Mw of 133,400 and Tg of 328° C. The hydroxy-modified rate to the unsaturated bonds was 100% as measured by $^1$H-NMR, and the hydroxy content in the polymer was 3.0% per repeating structural unit of the polymer.

(Blending)

When 15 parts of the hydroxy-modified terpolymer and 1.5 parts of to tolylene diisocyanate as a crosslinking agent were dissolved in 45 parts of xylene, a uniform solution was provided without forming any precipitate.
(Laminated Wiring Circuit Board)

A laminated wiring circuit board was produced in the same manner as in Example 5 except that the uniform solution obtained above was used, and evaluated. As a result, the laminate was found to have a dielectric constant of 2.5, a dielectric loss tangent of 0.0007 and a water absorptivity of 0.05% like Example 5. The laminate was subjected to a PCT test and a heat cycle test in accordance with the respective methods described above. As a result, its percent defective was both 0%.

Comparative Example 21
(Polymerization)

An addition polymer of 2-norbornene (NB) [number average molecular weight (Mn)=79,200, weight average molecular weight (Mw)=182,100, both, in terms of polystyrene; Tg=365° C.] was obtained in accordance with the publicly known process described in U.S. Pat. No. 5,468,819.

EPOXY MODIFICATION

Dissolved in 130 parts of t-butylbenzene were 28 parts of the thus-obtained polynorbornene, 10 parts of 5,6-epoxy-1-hexene and 2 parts of dicumyl peroxide, and a reaction was conducted at 140° C. for 6 hours. The resultant solution of a reaction product was poured into 300 parts of methanol to solidify a reaction product. The polymer thus solidified was dried under reduced pressure at 100° C. for 20 hours to obtain 26 parts of an epoxy-modified NB addition polymer. This modified polymer had Mn of 82,100, Mw of 206,100 and Tg of 366° C. The epoxy group content in the modified polymer was 1.9% per repeating structural unit of the polymer as measured by $^1$H-NMR.
(Blending)

When 15 parts of the epoxy-modified NB addition polymer obtained above and 0.6 parts of 4,4'-bisazidobenzal(4-methyl)cyclohexane as a photo-induced hardening agent were dissolved in 45 parts of xylene, a uniform solution was provided without forming any precipitate.
(Laminated Wiring Circuit Board)

A laminated wiring circuit board was produced in the same manner as in Example 5 except that the uniform solution obtained above was used, and evaluated. As a result, the laminate was found to have a dielectric constant of 2.35, a dielectric loss tangent of 0.0003 and a water absorptivity of 0.03%. However, cracking occurred in the film in both PCT test and heat cycle test, and the percent defective was increased to 5% and 7%, respectively.

Comparative Example 3
(Polymerization)

An addition copolymer of NB and ethylene [Mn=66,200, Mw=142,400; compositional ratio NB/ethylene of monomers=63/37 (mol %)] was obtained in accordance with the publicly known process described in Japanese Patent Application Laid-Open No. 292020/1995.
(Epoxy Modification)

Dissolved in 130 parts of t-butylbenzene were 30 parts of the thus-obtained NB/ethylene addition copolymer, 10 parts of 5,6-epoxy-1-hexene and 2 parts of dicumyl peroxide, and a reaction was conducted at 140° C. for 6 hours. The thus-obtained solution of a reaction product was poured into 300 parts of methanol to solidify the reaction product. The polymer thus solidified was dried under reduced pressure at 100° C. for 20 hours, thereby obtaining 29 parts of an epoxy-modified NB/ethylene addition copolymer. This modified polymer had Mn of 72,400, Mw of 192,300 and Tg of 185° C. The epoxy group content in the polymer was 2.4% per repeating structural unit of the polymer as measured by $^1$H-NMR.

(Blending)

When 15 parts of the epoxy-modified NB/ethylene addition copolymer obtained above and 0.6 parts of 4,4'-bisazidobenzal(4-methyl)cyclohexane as a photo-induced hardening agent were dissolved in 45 parts of xylene, a uniform solution was provided without forming any precipitate.

(Laminated Wiring Circuit Board)

A laminated wiring circuit board was produced in the same manner as in Example 5 except that the uniform solution obtained above was used, and evaluated. As a result, the laminate was found to have a dielectric constant of 2.4, a dielectric loss tangent of 0.0005 and a water absorptivity of 0.04%. However, cracking occurred in the film in both PCT test and heat cycle test, and the percent defective was increased to 4% and 5%, respectively.

INDUSTRIAL APPLICABILITY

According to the present invention, there are provided modified cycloolefin addition polymers which are particularly suitable for use in, for example, an electric and electronic field as insulating materials and the like and have excellent mechanical properties, solution viscosity characteristics, adhesion to metals and heat resistance, and curable resin compositions comprising such a polymer, a hardening agent and various kinds of additives. The modified cycloolefin addition polymers and curable resin compositions according to the present invention are useful in a wide variety of fields, in particular, as sealing materials for assembly boards, and the like, of which speeding up and high reliability are required, in fields of electric and electronic apparatus.

The modified cycloolefin addition polymers according to the present invention have excellent flexibility and film-forming property and can hence provide curable resin compositions from which cured films excellent in resistance to heat cycle and resistance to pressure cooker can be formed. Cured products (formed or molded products), particularly, films formed from the curable resin compositions according to the present invention are useful in a wide variety of fields as insulating materials for electronic parts, sealing materials and overcoating materials, and besides molding materials, etc.

What is claimed is:

1. A curable resin composition comprising a modified cycloolefin addition polymer (A) obtained by introducing a functional group into a cycloolefin addition polymer consisting essentially of
   a repeating unit (a) derived from a cycloolefin monomer having an organic group having at least 4 carbon atoms at its side chain, and
   a repeating unit (b) derived from a cycloolefin monomer having no organic group having at least 4 carbon atoms at its side chain,
   at a rate of introduction of the functional group of 0.1 to 50 mol % based on the whole repeating unit of the cycloolefin addition polymer, and a hardening agent (B).

2. The curable resin composition according to claim 1, wherein the cycloolefin addition polymer consists of the repeating unit (a) derived from the cycloolefin monomer having an organic group having at least 4 carbon atoms at its side chain, the repeating unit (b) derived from a cycloolefin monomer having no organic group having at least 4 carbon atoms at its side chain, and a repeating unit (c) derived from a vinyl compound.

3. The curable resin composition according to claim 1, wherein the cycloolefin addition polymer contains the repeating unit (a) derived from the cycloolefin monomer having an organic group having at least 4 carbon atoms at its side chain in a proportion of 10 to 70 mol % based on the whole repeating unit of the cycloolefin addition polymer.

4. The curable resin composition according to claim 1, wherein the modified cycloolefin addition polymer (A) is a graft-modified cycloolefin addition polymer obtained by introducing an unsaturated compound having a functional group into the cycloolefin addition polymer by a graft reaction.

5. The curable resin composition according to claim 4, wherein the unsaturated compound having a functional group is a vinyl compound (d) having a functional group or a cycloolefin (e) having a functional group.

6. The curable resin composition according to claim 4, wherein the unsaturated compound having a functional group is an unsaturated epoxy compound, unsaturated alcohol, unsaturated carboxylic acid, unsaturated carboxylic acid anhydride or unsaturated silane compound.

7. The curable resin composition according to claim 1, wherein the modified cycloolefin addition polymer (A) is a modified cycloolefin addition polymer obtained by modifying carbon-carbon unsaturated bonds in the cycloolefin addition polymer to add a functional group to the cycloolefin addition polymer, or bonding a compound having a functional group to the unsaturated bonds, thereby introducing the functional group.

8. The curable resin composition according to claim 1, wherein the organic group in the repeating unit (a) at its side chain is a hydrocarbon group having 4 to 20 carbon atoms.

9. The curable resin composition according to claim 1, wherein the weight average molecular weight (Mw) of the modified cycloolefin addition polymer (A) is within a range of 1,000 to 1,000,000.

10. The curable resin composition according to claim 1, wherein the repeating unit (a) is derived from a norbornene monomer having an organic group having at least 4 carbon atoms at its side chain.

11. The curable resin composition according to claim 1, wherein the repeating unit (b) derived from a cycloolefin monomer having no organic group having at least 4 carbon atoms at its side chain is a repeating unit (b) derived from a norbornene monomer having no organic group having at least 4 carbon atoms at its side chain.

12. The curable resin composition according to claim 10, wherein the cycloolefin addition polymer is ① an addition copolymer of 2-norbornene and 5-substituted-2-norbornene having a hydrocarbon group having 4 to 20 carbon atoms as a substituent, ② an addition copolymer of 2-norbornene, 5-substituted-2-norbornene having a hydrocarbon group having 4 to 20 carbon atoms as a substituent and a further norbornene monomer, or ③ an addition copolymer of 2-norbornene, 5-substituted-2-norbornene having a hydrocarbon group having 4 to 20 carbon atoms as a substituent and ethylene.

13. The curable resin composition according to claim 12, wherein the cycloolefin addition polymer is a norbornene addition copolymer selected from the group consisting of 2-norbornene/5-decyl-2-norbornene addition copolymers, 2-norbornene/5-hexyl-2-norbornene addition copolymers and 2-norbornene/5-hexyl-2-norbornene/ethylene addition terpolymers.

14. The curable resin composition according to claim 13, wherein the modified cycloolefin addition polymer (A) is a graft-modified norbornene addition polymer obtained by introducing an unsaturated epoxy compound, unsaturated carboxylic acid or unsaturated carboxylic acid anhydride into the norbornene addition copolymer by a graft reaction.

15. The curable resin composition according to claim 12, wherein the cycloolefin addition polymer is a 2-norbornene/5-hexyl-2-norbornene/5-ethylidene-2-norbornene addition terpolymer.

16. The curable resin composition according to claim 15, wherein the modified cycloolefin addition polymer (A) is a modified norbornene addition copolymer obtained by modifying carbon-carbon unsaturated bonds in the 2-norbornene/5-hexyl-2-norbornene/5-ethylidene-2-norbornene addition terpolymer to add a functional group to the addition terpolymer, or bonding a compound having a functional group to the unsaturated bonds, thereby introducing an epoxy group or hydroxyl group.

17. The curable resin composition according to claim 1, wherein the hardening agent (B) is a hardening agent capable of developing the effect by heat or a hardening agent capable of developing the effect by light.

18. The curable resin composition according to claim 1, which comprises the hardening agent (B) in a proportion of 0.1 to 30 parts by weight per 100 parts by weight of the modified cycloolefin addition polymer (A).

19. The curable resin composition according to claim 1, which further comprises an organic solvent in an amount sufficient to uniformly dissolve or disperse the individual components therein.

20. A cured product obtained by curing the curable resin composition according to claim 1.

21. The cured product according to claim 20, which is a film.

22. The cured product according to claim 21, which is a film having a thickness of at least 20 μm.

23. A modified cycloolefin addition polymer (A) obtained by introducing a functional group into a cycloolefin addition polymer consisting essentially of
    a repeating unit (a) derived from a cycloolefin monomer having an organic group having at least 4 carbon atoms at its side chain, and
    a repeating unit (b) derived from a cycloolefin monomer having no organic group having at least 4 carbon atoms at its side chain,
    at a rate of introduction of the functional group of 0.1 to 50 mol % based on the whole repeating unit of the cycloolefin addition polymer, and having a weight average molecular weight (Mw) of 1,000 to 1,000,000.

24. The modified cycloolefin addition polymer (A) according to claim 23, wherein the cycloolefin addition polymer consists of the repeating unit (a) derived from the cycloolefin monomer having an organic group having at least 4 carbon atoms at its side chain, the repeating unit (b) derived from a cycloolefin monomer having no organic group having at least 4 carbon atoms at its side chain, and a repeating unit (c) derived from a vinyl compound.

25. The modified cycloolefin addition polymer (A) according to claim 23, wherein the cycloolefin addition polymer contains the repeating unit (a) derived from the cycloolefin monomer having an organic group having at least 4 carbon atoms at its side chain in a proportion of 10 to 70 mol % based on the whole repeating unit of the cycloolefin addition polymer.

26. The modified cycloolefin addition polymer (A) according to claim 23, wherein the modified cycloolefin addition polymer (A) is a graft-modified cycloolefin addition polymer obtained by introducing an unsaturated compound having a functional group into the cycloolefin addition polymer by a graft reaction.

27. The modified cycloolefin addition polymer (A) according to claim 26, wherein the unsaturated compound having a functional group is a vinyl compound (d) having a functional group or a cycloolefin (e) having a functional group.

28. The modified cycloolefin addition polymer (A) according to claim 23, wherein the modified cycloolefin addition polymer (A) is a modified cycloolefin addition polymer obtained by directly modifying carbon-carbon unsaturated bonds in the cycloolefin addition polymer to introduce the functional group.

29. The modified cycloolefin addition polymer (A) according to claim 24, wherein the repeating unit (a) derived from the cycloolefin monomer having an organic group having at least 4 carbon atoms at its side chain is that represented by the formula [I]:

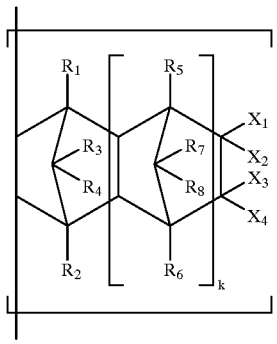

[I]

wherein
k=0, 1 or 2,
$R_1$ to $R_8$=independently a hydrogen atom, halogen atom or methyl group,
$X_1$ to $X_4$=independently an organic group having at least 4 carbon atoms, a hydrogen atom, a halogen atom, or a substituent having at most 3 carbon atoms, with the proviso that at least one of them is the organic group having at least 4 carbon atoms,
the repeating unit (b) derived from the cycloolefin monomer having no organic group having at least 4 carbon atoms at its side chain is that represented by the formula [II]:

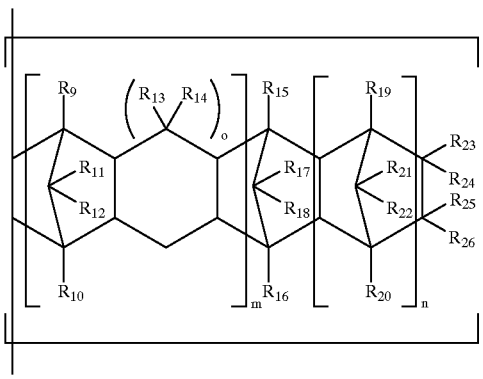

[II]

wherein
m=0 or 1,
n=0 or a positive integer, preferably 0, 1 or 3,
o=0 or 1,
$R_9$ to $R_{22}$=independently a hydrogen atom, halogen atom or methyl group, and $R_{23}$ to $R_{26}$=independently a substituent having at most 3 carbon atoms, or a substituent bonded to each other to form a monocycle or polycycle, said substituent may having carbon-carbon double bond(s); or that represented by the formula [III]:

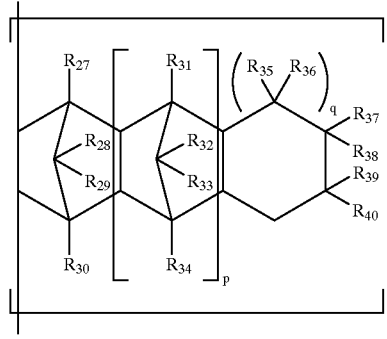

[III]

wherein
p=0, 1 or 2,
q=0, 1 or 2,
$R_{27}$ to $R_{36}$=independently a hydrogen atom, halogen atom or methyl group, and
$R_{37}$ to $R_{40}$=independently a substituent having at most 3 carbon atoms, or a substituent bonded to each other to form a monocycle or polycycle, said substituent may having carbon-carbon double bond(s), and
the repeating unit (c) derived from the vinyl compound is that represented by the formula [IX]:

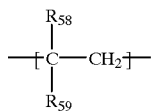

[IX]

wherein $R_{58}$ and $R_{59}$ are independently a hydrogen atom, alkyl group or aryl group.

30. The modified cycloolefin addition polymer (A) according to claim 24, wherein the repeating unit (a) derived from the cycloolefin monomer having an organic group having at least 4 carbon atoms at its side chain is that represented by the formula [VI]:

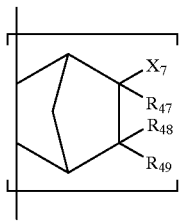

[VI]

wherein
$X_7$=a substituent having 4 to 20 carbon atoms, and
$R_{47}$ to $R_{49}$=independently a hydrogen atom, halogen atom, methyl group or ethyl group,
the repeating unit (b) derived from the cycloolefin monomer (norbornene monomer) having no organic group having at least 4 carbon atoms at its side chain is that represented by the formula [VII]:

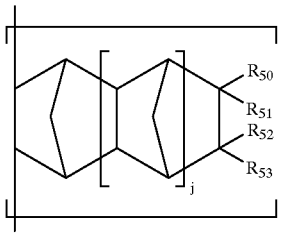

[VII]

wherein
j=0 or 1, and
$R_{50}$ to $R_{53}$=independently a hydrogen atom, a halogen atom, a substituent having at most 3 carbon atoms, or a substituent bonded to each other to form a monocycle or polycycle, said substituent may having carbon-carbon double bond(s); or that represented by the formula [VIII]:

[VIII]

wherein
$R_{54}$ to $R_{57}$=independently a hydrogen atom, a halogen atom, a substituent having at most 3 carbon atoms, or a substituent bonded to each other to form a monocycle or polycycle, said substituent may having carbon-carbon double bond(s),
the repeating unit (c) derived from the vinyl compound is that represented by the formula [X]:

$-(CH_2-CH_2)-$ [X].

31. The modified cycloolefin addition polymer (A) according to claim 27, wherein the vinyl compound (d) having a functional group is that represented by the formula [IV]:

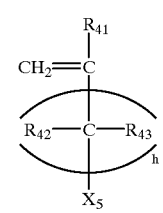

[IV]

wherein
h=0 or an positive integer,
$R_{41}$ to $R_{43}$=independently a hydrogen atom, a halogen atom, or a hydrocarbon group having 1 to 20 carbon atoms, and
$X_5$=a substituent having at least one functional group of epoxy, hydroxyl, carboxyl, carbonyl, alkoxy, alkoxycarbonyl, silyl, nitrile, amino, amide and carbonyloxy groups, and the cycloolefin (e) having a functional group is that represented by the formula [V]:

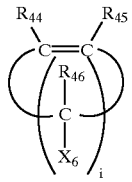

[V]

wherein i=an positive integer of 1 to 20, $R_{44}$ to $R_{46}$=independently a hydrogen atom, a halogen atom, or a hydrocarbon group having 1 to 20 carbon atoms, with the proviso that some of i $R_{46}$ groups may be bonded to each other to form a further ring, and $X_6$=a substituent having at least one functional group of epoxy, hydroxyl, carboxyl, carbonyl, alkoxy, alkoxycarbonyl, silyl, nitrile, amino, amide and carbonyloxy groups, or a hydrogen atom, a halogen atom or a substituent having 1 to 20 carbon atoms, with the proviso that at least one of i $X_6$ groups is the substituent having said functional group.

32. The modified cycloolefin addition polymer (A) according to claim 31, wherein the vinyl compound (d) having a functional group represented by the formula [IV], and the cycloolefin (e) having a functional group represented by the formula [V] are each an unsaturated epoxy compound, unsaturated alcohol, unsaturated carboxylic acid, unsaturated carboxylic acid anhydride or unsaturated silane compound.

33. The modified cycloolefin addition polymer (A) according to claim 23, wherein the organic group in the repeating unit (a) at its side chain is a hydrocarbon group having 4 to 20 carbon atoms.

34. The modified cycloolefin addition polymer (A) according to claim 30, wherein the cycloolefin addition polymer is ① an addition copolymer of 2-norbornene and 5-substituted- 2-norbornene having a hydrocarbon group having 4 to 20 carbon atoms as a substituent, ② an addition copolymer of 2-norbornene, 5-substituted-2-norbornene having a hydrocarbon group having 4 to 20 carbon atoms as a substituent and a further norbornene monomer, or ③ an addition copolymer of 2-norbornene, 5-substituted-2-norbornene having a hydrocarbon group having 4 to 20 carbon atoms as a substituent and ethylene.

35. The modified cycloolefin addition polymer (A) according to claim 34, wherein the cycloolefin addition polymer is a norbornene addition copolymer selected from the group consisting of 2-norbornene/5-decyl-2-norbornene addition copolymers, 2-norbornene/5-hexyl-2-norbornene addition copolymers and 2-norbornene/5-hexyl-2-norbornene/ethylene addition terpolymers.

36. The modified cycloolefin addition polymer (A) according to claim 35, wherein the modified cycloolefin addition polymer (A) is a graft-modified norbornene addition polymer obtained by introducing an unsaturated epoxy compound, unsaturated carboxylic acid or unsaturated carboxylic acid anhydride into the norbornene addition copolymer by a graft reaction.

37. The modified cycloolefin addition polymer (A) according to claim 34, wherein the cycloolefin addition polymer is a 2-norbornene/5-hexyl-2-norbornene/5-ethylidene-2-norbornene addition terpolymer.

38. The modified cycloolefin addition polymer (A) according to claim 37, wherein the modified cycloolefin addition polymer (A) is a modified norbornene addition copolymer obtained by modifying carbon-carbon unsaturated bonds in the 2-norbornene/5-hexyl-2-norbornene/5-ethylidene-2-norbornene addition terpolymer to add a functional group to the addition terpolymer, or bonding a compound having a functional group to the unsaturated bonds, thereby introducing an epoxy group or hydroxyl group.

39. A process for preparing a modified cycloolefin addition polymer (A) having a weight average molecular weight (Mw) of 1,000 to 1,000,000, the process comprising graft-reacting an unsaturated compound having a functional group with a cycloolefin addition polymer consisting essentially of a repeating unit (a) derived from a cycloolefin monomer having an organic group having at least 4 carbon atoms at its side chain, and a repeating unit (b) derived from a cycloolefin monomer having no organic group having at least 4 carbon atoms at its side chain, thereby introducing the functional group at a rate of introduction of the functional group of 0.1 to 50 mol % based on the whole repeating unit of the cycloolefin addition polymer.

40. A process for preparing a modified cycloolefin addition polymer (A) having a weight average molecular weight (Mw) of 1,000 to 1,000,000, the process comprising modifying carbon-carbon unsaturated bonds in a cycloolefin addition polymer consisting essentially of a repeating unit (a) derived from a cycloolefin monomer having an organic group having at least 4 carbon atoms at its side chain, and a repeating unit (b) derived from a cycloolefin monomer having no organic group having at least 4 carbon atoms at its side chain, to add a functional group to the cycloolefin addition polymer, or bonding a compound having a functional group to the unsaturated bonds, thereby introducing the functional group at a rate of introduction of the functional group of 0.1 to 50 mol % based on the whole repeating unit of the cycloolefin addition polymer.

41. A curable resin composition comprising a cycloolefin addition polymer consisting essentially of a repeating unit (a) derived from a cycloolefin monomer having an organic group having at least 4 carbon atoms at its side chain, and a repeating unit (b) derived from a cycloolefin monomer having no organic group having at least 4 carbon atoms at its side chain, and a hardening agent.

42. A curable resin composition comprising a cycloolefin addition polymer (A) obtained by introducing a functional group into a cycloolefin addition polymer consisting essentially of a repeating unit (a) derived from a norbornene monomer having an organic group having at least 4 carbon atoms at its side chain, and a repeating unit (b) derived from a norbornene monomer having no organic group having at least 4 carbon atoms at its side chain, at a rate of introduction of the functional group of 0.1 to 50 mol % based on the whole repeating unit of the cycloolefin addition polymer, and a hardening agent.

43. A modified cycloolefin addition polymer (A) obtained by introducing a functional group into a cycloolefin addition polymer consisting essentially of a repeating unit (a) derived from a norbornene monomer having an organic group having at least 4 carbon atoms at its side chain, and a repeating unit (b) derived from a norbornene monomer having no organic group having at least 4 carbon atoms at its side chain, at a rate of introduction of the functional group of 0.1 to 50 mol % based on the whole repeating unit of the cycloolefin addition polymer, and having a weight average molecular weight (Mw) of 1,000 to 1,000,000.

* * * * *

UNITED STATES PATENT AND TRADEMARK OFFICE
CERTIFICATE OF CORRECTION

PATENT NO.    : 6,346,581 B1
DATED         : February 12, 2002
INVENTOR(S)   : Yasuo Tsunogae et al.

It is certified that error appears in the above-identified patent and that said Letters Patent is hereby corrected as shown below:

Column 38,
Line 66, change "$R_{29}$" to -- $R_9$ --;

Column 39,
Line 4, change "having" to -- have --; and
Line 32, change "having" to -- have --.

Signed and Sealed this

Twenty-third Day of April, 2002

Attest:

Attesting Officer

JAMES E. ROGAN
Director of the United States Patent and Trademark Office